(12) United States Patent
Hu et al.

(10) Patent No.: US 10,872,457 B1
(45) Date of Patent: Dec. 22, 2020

(54) FACIAL TEXTURE MAP GENERATION USING SINGLE COLOR IMAGE AND DEPTH INFORMATION

(71) Applicant: SONY CORPORATION, Tokyo (JP)

(72) Inventors: Jie Hu, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/515,263

(22) Filed: Jul. 18, 2019

(51) Int. Cl.
*G06T 15/04* (2011.01)
*G06T 7/40* (2017.01)
*G06T 17/20* (2006.01)
*G06T 15/50* (2011.01)
*G06T 3/00* (2006.01)

(52) U.S. Cl.
CPC ............ *G06T 15/04* (2013.01); *G06T 3/0006* (2013.01); *G06T 7/40* (2013.01); *G06T 15/506* (2013.01); *G06T 17/20* (2013.01); *G06T 2207/10024* (2013.01); *G06T 2207/10028* (2013.01); *G06T 2207/30201* (2013.01)

(58) Field of Classification Search
CPC ......... G06T 15/04; G06T 3/0006; G06T 7/40; G06T 15/506; G06T 17/20
USPC ....................................................... 345/420
See application file for complete search history.

(56) References Cited

U.S. PATENT DOCUMENTS

| | | | |
|---|---|---|---|
| 8,090,160 B2 | 1/2012 | Kakadiaris et al. | |
| 2018/0046854 A1 | 2/2018 | Kittler et al. | |
| 2020/0013212 A1* | 1/2020 | Wang | G06T 13/20 |

OTHER PUBLICATIONS

Huber, "A Multiresolution 3D Morphable Face Model and Fitting Framework", 11th Joint Conference on Computer Vision, Imaging and Computer Graphics Theory and Applications, Feb. 27-29, 2016, vol. 4: VISAPP, pp. 79-86, (year 2016).*
Huber, et al., "A Multiresolution 3D Morphable Face Model and Fitting Framework", 11th International Joint Conference on Computer Vision, Imaging and Computer Graphics Theory and Applications, Feb. 27-29, 2016, 08 pages.

\* cited by examiner

*Primary Examiner* — Hai Tao Sun
(74) *Attorney, Agent, or Firm* — Chip Law Group

(57) ABSTRACT

An electronic apparatus for facial texture map generation using single color image and depth information is provided. The electronic apparatus stores a first color image and corresponding depth information of a face, an un-textured three-dimensional (3D) face model of the face and a reference facial texture model. The electronic apparatus generates a first texture map of the face based on the un-textured 3D face model, the first color image, and the depth information. The electronic apparatus further generates a second texture map by texture model fitting of the reference facial texture model on a plurality of first effective points on the first texture map. The electronic apparatus refines the second texture map based on minimization of an objective function for the second texture map and further generates a final texture map based on the first texture map and the refined second texture map.

23 Claims, 8 Drawing Sheets

FACIAL TEXTURE MAP GENERATION USING SINGLE COLOR IMAGE AND DEPTH INFORMATION

CROSS-REFERENCE TO RELATED APPLICATIONS/INCORPORATION BY REFERENCE

None.

FIELD

Various embodiments of the disclosure relate to three-dimensional (3D) modeling technology, virtual human technology, and Virtual Reality (VR) technology. More specifically, various embodiments of the disclosure relate to an electronic apparatus and a method for facial texture map generation using a single color image and depth information.

BACKGROUND

Advancements in the field of three-dimensional (3D) computer graphics and 3D modeling have provided multiple techniques that help to create 3D models and visualize real objects in a 3D computer graphics environment. 3D models, such as 3D character models, are increasingly used in animated movies, games, and virtual-reality systems to enhance user experience. A 3D face model of a face of a person may be a 3D graphical model that may resemble the actual face of the person. Conventionally, a texture map may be required to render facial texture associated with the person onto a 3D face model. This may be performed to ensure that the rendered 3D face model is similar to the face of the person and appears realistic to a viewer.

In some conventional approaches, the texture map may be generated based on limited number of facial images captured from a limited number of viewpoints. In such approaches, the texture map may be generated by direct mapping of color information from the limited number of facial images on a U-V coordinate map. However, the generated texture map may not represent the whole texture of the face of the person due to occlusions caused by the limited number of viewpoints. For example, if an image is captured from a frontal view of the face, texture for some regions of the face such as, side of the face, ears, and neck, may be absent in the texture map. Such texture map for the 3D face model may be incomplete and undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and a method for facial texture map generation using a single color image and depth information, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for facial texture map generation using a single color image and depth information. Exemplary aspects of the disclosure provide an electronic apparatus that may include a memory and circuitry. The memory may be configured to store a first color image and corresponding depth information of a face of a user, an un-textured three-dimensional (3D) face model of the face of the user, and a reference facial texture model. Specifically, the first color image and the corresponding depth information may represent a frontal view of the face of the user. An example of the reference facial texture model may be a principal component analysis (PCA) texture model for a plurality of faces different from the face of the user.

The disclosed electronic apparatus may be configured to generate a texture map of the face of the user based on a combination of two texture maps, i.e. a first texture map and a second texture map. The first texture map may be generated based on the single high-resolution color image and an un-textured 3D face model of the face of the user. The single high-resolution color image may represent the frontal view of the face of the user. The un-textured 3D face model may be a shape-refined 3D model of the face of the user and may precisely represent a plurality of shape features of the face of the user. Thus, the generated first texture map may have texture precisely mapped to shaped-portions of the un-textured 3D face model and may be more reliable than a texture map that may be generated based on a shape unrefined 3D face model. The first texture map may capture texture information of all the frontal facial region of the face and remnant facial regions of the face may be absent or inaccurately represented in the first texture map as the texture information of the remnant facial regions of the face may be occluded in the single high-resolution color image.

The disclosed electronic apparatus may be further configured to generate the second texture map based on a texture model-fitting of the reference facial texture model on the first texture map. The reference facial texture model may be a facial texture model that may be generated based on a PCA on a plurality of facial texture maps of a plurality of faces different from the face of the user. The generated second texture map may include texture information of the remnant facial regions of the face. The disclosed electronic apparatus may be further configured to generate a final texture map based on a combination of the first texture map and the second texture map. The final texture map may include texture information of the frontal facial region, such as the eyes, nose, and lips, from the first texture map and the remnant facial regions, such as ears and sides of the neck, from the second texture map. The generated final texture map may represent a complete texture of the face of the user.

Figure 1:
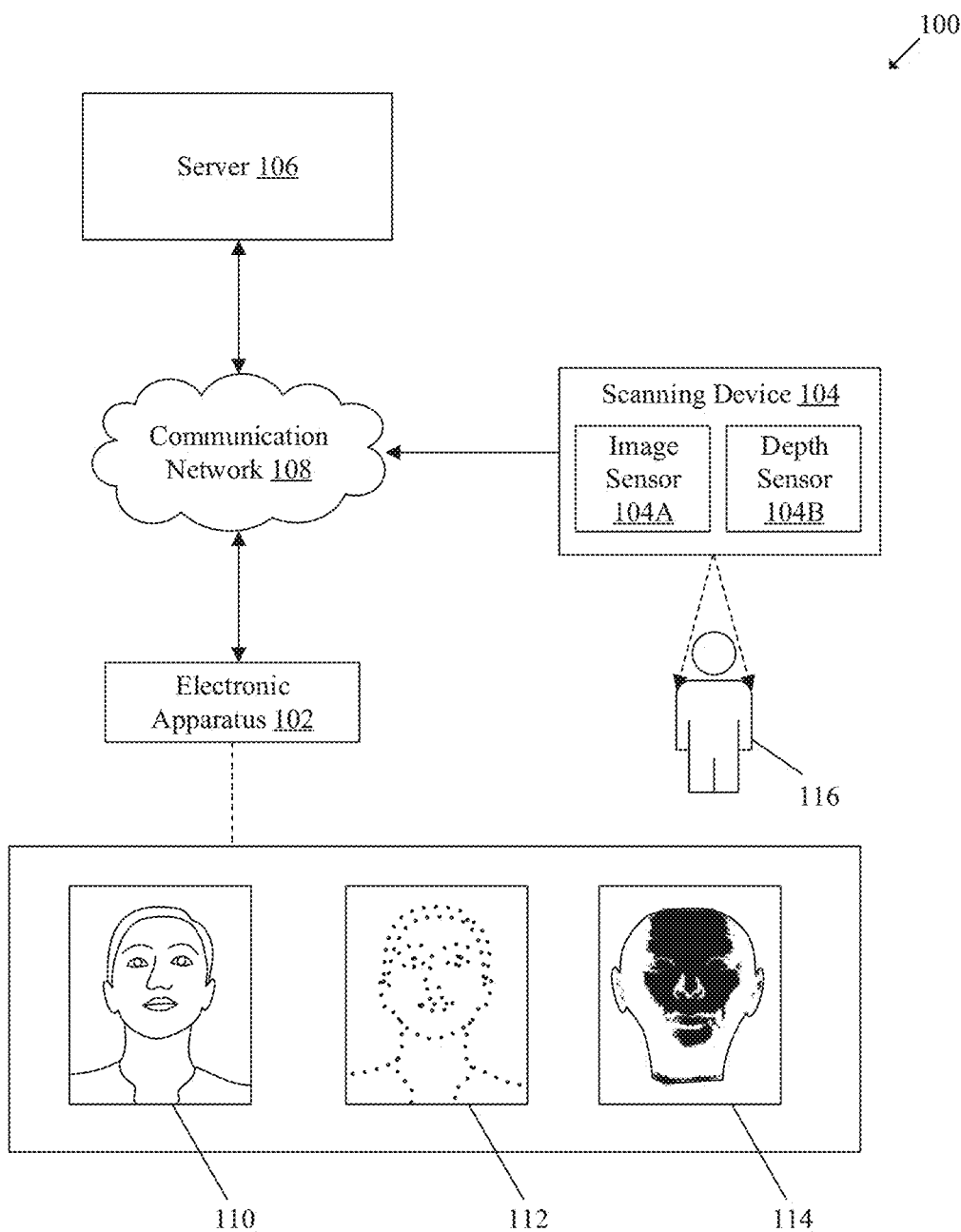
FIG. 1 is a block diagram that illustrates an exemplary network environment for facial texture map generation using a single color image and depth information, in accordance with an embodiment of the disclosure.

FIG. 1 is a block diagram that illustrates an exemplary network environment for facial texture map generation using a single color image and depth information, in accordance with an embodiment of the disclosure. With reference to FIG. 1, there is shown a network environment 100. The network environment 100 may include an electronic apparatus 102, a scanning device 104, and a server 106. The scanning device 104 may further include an image sensor 104A and a depth sensor 104B. The electronic apparatus 102, the scanning device 104, and the server 106 may be communicatively coupled to each other, via a communication network 108. A user 116 may be associated with the scanning device 104. The electronic apparatus 102 may be configured to store a first color image 110 of a face of the user 116, depth information 112 of the face of the user 116, and an un-textured three-dimensional (3D) face model 114 of the face of the user 116.

The electronic apparatus 102 may comprise suitable logic, circuitry, and interfaces that may be configured to store a reference facial texture model. The reference facial texture model may be a plurality of eigenvalues and a plurality of eigenvectors extracted by application of PCA on a plurality of facial texture maps for a plurality of faces different from the face of the user 116. The electronic apparatus 102 may be further configured to generate a first texture map of the face of the user 116 based on the un-textured 3D face model 114, the first color image 110, and the depth information 112 of the face of the user 116. The electronic apparatus 102 may be further configured to generate a second texture map of the face of the user 116 based on texture model fitting of the reference facial texture model on the generated first texture map. The electronic apparatus 102 may be further configured to refine the generated second texture map and generate a final texture map of the face of the user 116 based on the first texture map and the refined second texture map. Examples of the electronic apparatus 102 may include, but are not limited to, a computing device, smartphone, a video-conferencing system, an augmented reality-based device, a gaming device, a mainframe machine, a server, a computer work-station, and/or a consumer electronic (CE) device.

The scanning device 104 may comprise suitable logic, circuitry, and interfaces that may be configured to scan a face of the user 116. The scanning device 104 may be configured to capture a plurality of color images and corresponding depth information of the face of the user 116 from one or more viewing angles. The scanning device 104 may be further configured to transmit the captured plurality of color images and corresponding depth information to the electronic apparatus 102 and the server 106, via the communication network 108. The scanning device 104 may include a plurality of sensors, such as a combination of an image sensor (such as the image sensor 104A), a depth sensor (such as the depth sensor 104B), a color sensor (such as a red-green-blue (RGB) sensor), and/or an infrared (IR) sensor which may capture the face of the user 116 from different viewing angles. Examples of the scanning device 104 may include, but are not limited to, the depth sensor, the RGB sensor, the IR sensor, a 3D-mesh structure generator, an image sensor, or a motion-detector device.

The server 106 may comprise suitable logic, circuitry, and interfaces that may be configured to store the plurality of color images and corresponding depth information captured by the scanning device 104. In accordance with an embodiment, the server 106 may be further configured to store the reference facial texture model for a plurality of faces different from the face of the user 116. Examples of the server 106 may include, but are not limited to, a database server, a file server, a web server, a cloud server, an application server, a mainframe server, or other types of servers.

The communication network 108 may include a communication medium through which the electronic apparatus 102, the scanning device 104, and the server 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the scanning device 104 may be configured to capture a first plurality of color images of a face of the user 116 and first depth information corresponding to the first plurality of color images from one or more viewing angles. The user 116 may be positioned in front of the scanning device 104. The image sensor 104A of the scanning device 104 may be configured to capture the first plurality of color images of the face of the user 116 who may be positioned in front of the scanning device 104. The depth sensor 104B may be configured to capture the first depth information corresponding to the first plurality of color images of the face of the user 116. The captured first depth information of the face of the user 116 may include information about "Z" coordinates of points on the face of the user 116 in a 3D space. For example, an amount of protrusion, such as a mole, protuberance of a nose, depth of cheek region with respect to forehead region, and different depths of different regions of the face may be estimated with accuracy based on the first depth information of each region of the face of the user 116.

The first plurality of color images and the corresponding first depth information may be synchronized with each other such that the first plurality of color images and the corresponding depth information of the face of the user 116 may be captured together at a same time and may represent a same field-of-view. The synchronization of the first plurality of color images and the corresponding first depth information may provide an enhanced understanding of the shape, different facial features, and depth of each region of face from a three dimensional perspective. The scanning device 104 may be further configured to transmit the first plurality of color images and the corresponding first depth information to the electronic apparatus 102 and the server 106, via the communication network 108. In some embodiments, the scanning device 104 may be a part of the electronic apparatus 102. In such cases, the first plurality of color images and the corresponding first depth information may be directly stored at the electronic apparatus 102.

The electronic apparatus 102 may be configured to store the first color image 110 of the first plurality of color images and the depth information 112 corresponding to the first color image 110. The first color image 110 may be synchronized with the depth information 112. The first color image 110 may be a high-resolution image that may depict an actual texture of the face of the user 116. The first color image 110 may be captured from a frontal view of the face of the user 116.

The electronic apparatus 102 may be further configured to store the un-textured 3D face model 114 of the face of the user 116. The un-textured 3D face model 114 may be a mathematical representation of the face of the user 116 in the 3D space. The un-textured 3D face model 114 may be a shape-refined 3D face model of the face of the user 116. The shape of the un-textured 3D face model 114 may be same or nearly same as the shape of the face of the user 116. The shape of a plurality of landmark regions on the un-textured 3D face model 114 may be same or nearly same as the actual shape of the plurality of landmark regions on the face of the user 116. The plurality of landmark regions may correspond to distinct features, such as eyes, nose, lips, and other similar features which define a human face, of the face of the user 116. The texture information of the face of the user 116 may be absent in the un-textured 3D face model 114.

In accordance with an embodiment, the electronic apparatus 102 may be configured to generate the un-textured 3D face model 114 based on the first plurality of color images and the corresponding first depth information. Exemplary operations for generation of the un-textured 3D face model 114 are described herein. To generate the un-textured 3D face model 114 of the face of the user 116, the electronic apparatus 102 may be configured to store a 3D face model that may be generated based on Principal Component Analysis (PCA) on a plurality of faces, for example 100-300 faces. A shape of the stored 3D face model may be a mean shape of the plurality of faces. The electronic apparatus 102 may be further configured to generate a point cloud of the face of the user 116, based on the first plurality of color images and the corresponding first depth information. The point cloud may be generated to represent the external surface of the face of the user 116 that includes a plurality of feature points, such as the eyes, nose, and lips.

The electronic apparatus 102 may be further configured to align the generated point cloud with the stored 3D face model. The electronic apparatus 102 may be further configured to apply a rigid alignment operation on a plurality of feature points on the face of the user 116 and a non-rigid alignment operation on all the remaining feature points on the face of the user 116. In the rigid alignment operation, the electronic apparatus 102 may be configured to align the plurality of feature points, such as the eyes, nose, lips, and/or other feature points, of the face of the user 116 with the stored 3D face model to generate a rigid aligned point cloud. In the non-rigid alignment operation, all the remaining feature points on the face of the user 116 may be aligned with the stored 3D face model.

The electronic apparatus 102 may be further configured to generate a deformed mean-shape face model in a neutral expression based on application of rigid and non-rigid alignment operation on the stored 3D face model. The stored 3D face model may represent the face of the user 116 as a combination of different basic shape components. The electronic apparatus 102 may be further configured to estimate weights of the different basic shape components of the stored 3D face model. The electronic apparatus 102 may be further configured to generate a first 3D face model of the face of the user 116 by shape-based model-fitment on the stored 3D face model using the generated point cloud, based on the estimated weights. The electronic apparatus 102 may be further configured to refine a shape of the first 3D face model of the face of the user 116.

The electronic apparatus 102 may be configured to include user-specific appearance attributes to the first 3D face model of the face of the user 116 to refine the shape of the first 3D face model. The electronic apparatus 102 may be further configured to generate a refined first 3D face model of the face of the user 116, based on shape refinement of the first 3D face model. The generated refined first 3D face model of the face of the user 116 may correspond to the un-textured 3D face model 114 of the face of the user 116.

The electronic apparatus 102 may be further configured to store a reference facial texture model. The reference facial texture model may be a plurality of eigenvectors and eigenvalues extracted by application of PCA on a plurality of facial texture maps for a plurality of faces different from the face of the user 116. For example, hundreds of faces of different human beings with different textures. Each face of the plurality of faces may be different from each other in terms of age, facial features, color, and smoothness. A facial texture map of a face of a user may be a 2D map (e.g., a U-V coordinate map) that may represent an appearance of the face of that user. The reference facial texture model may be a facial texture model that may be generated based on Principal Component Analysis (PCA) on the plurality of facial texture maps of the plurality of faces different from the face of the user 116.

In some embodiments, the electronic apparatus 102 may be configured to retrieve the reference facial texture model from a server, such as the server 106. In some other embodiments, the scanning device 104 may be configured to capture a second plurality of color images and corresponding second depth information of the plurality of faces different from the face of the user 116. The second plurality of color images and the corresponding second depth information may be captured from a plurality of viewpoints. For example, the scanning device 104 may be one or more high-resolution cameras and therefore, the captured second plurality of color images may be high-resolution images of the plurality of faces that may be captured from the plurality of viewpoints. The captured second plurality of color images and the corresponding second depth information may represent an entire face portion of the plurality of faces different from the face of the user 116. One or more high resolution camera may help to capture more viewpoints of the face so as to obtain the reference facial texture model by application of PCA on high resolution texture maps. The scanning device 104 may be configured to capture the second plurality of color images under a common ambient lighting condition, such as a white light background. The electronic apparatus 102 may be further configured to generate a face mesh of each of the plurality of faces based on the captured second plurality of color images. The face mesh of each of the plurality of faces may be a 3D mesh made up of a plurality of polygons (such as triangles).

The electronic apparatus 102 may be further configured to unwrap each face mesh of each face of the plurality of faces on a U-V coordinate map. A U-V coordinate map may be a 2D representation of a texture of a 3D model. The electronic apparatus 102 may be further configured to generate a facial texture map of each face of the plurality of faces different from the face of the user 116, based on unwrap of the face mesh on the U-V coordinate map. The electronic apparatus 102 may be further configured to generate the reference facial texture model by application of Principal Component Analysis (PCA) on a plurality of facial texture maps for the plurality of faces different from the face of the user 116. The PCA may be utilized to identify and extract certain important uncorrelated data components from a large set of correlated data components. The generation of the reference facial texture model is further described in details, for example, in FIG. 3.

The electronic apparatus 102 may be further configured to determine a first plurality of triangles on the first color image 110 and a second plurality of triangles on the un-textured 3D face model 114. The electronic apparatus 102 may be further configured to map each triangle of the first plurality of triangles on the first color image 110 to a corresponding triangle of the second plurality of triangles on the un-textured 3D face model 114. Each triangle of the first plurality of triangles may be mapped to the corresponding triangle of the second plurality of triangles based on a perspective projection of the first color image 110 on the un-textured 3D face model 114. The electronic apparatus 102 may be further configured to determine a third plurality of triangles on a U-V coordinate map. The U-V coordinate map may be a 2D feature image that may represent a texture map of a 3D model. The "U" and "V" of the U-V coordinate map may represent 2D coordinates of the texture values from the face of the user 116. The electronic apparatus 102 may be further configured to determine a third plurality of triangles on the U-V coordinate map based on mapping of each of the second plurality of triangles of the un-textured 3D face model 114 on a corresponding triangle of the third plurality of triangles on the U-V coordinate map.

The electronic apparatus 102 may be further configured to compute an affine transformation between the third plurality of triangles on the U-V coordinate map and the first plurality of triangles on the first color image 110. The affine transformation may refer to a function which preserves points, straight lines, and planes in images. The affine transformation may be estimated to align the third plurality of triangles on the U-V coordinate map with the first plurality of triangles on the first color image 110.

The electronic apparatus 102 may be further configured to apply color information to each of the third plurality of triangles on the U-V coordinate map from the corresponding triangle of the first plurality of triangles on the first color image 110, based on the computed affine transformation. The electronic apparatus 102 may be further configured to generate a first texture map of the face of the user 116 based on the application of the color information to each of the third plurality of triangles on the U-V coordinate map. The first texture map may represent a texture of the face of the user 116 based on the color information of the first color image 110. The first texture map may represent an accurate texture of the frontal face portion of the face of the user 116. However, the texture of some portions, such as ears and sides of the neck, of the face of the user 116 may be absent or inaccurately represented in the first texture map. The absence or inaccurate representation of such portions in first texture map may be a result of occlusion of such portions in the first color image 110. The generation of the first texture map is further described in details, for example, in FIG. 5.

The electronic apparatus 102 may be further configured to generate a second texture map of the face of the user 116 by texture model fitting of the reference facial texture model on a plurality of first effective points on the generated first texture map. The plurality of first effective points may be a plurality of points that belong to facial region of the user 116 that may be observed in the first color image 110. Since the reference facial texture model is generated based on application of PCA on the plurality of facial texture maps of the plurality of faces different from the face of the user 116, the lighting conditions for the reference facial texture model may be different from the lighting conditions for the face of the user 116.

The first color image 110 may include some external lighting influence, such as lighting influence from external light sources on the face of the user 116. As the first texture map is generated based on the first color image 110, the first texture map may include the lighting influence from the external light sources. The electronic apparatus 102 may be further configured to refine the second texture map based on a removal of the lighting influence from the first texture map. The first texture map without the lighting influence may be used as a reference to refine the second texture map. The electronic apparatus 102 may be further configured to refine the second texture map based on minimization of an objective function for the generated second texture map. The objective function may include an offset term and a smoothening term. The electronic apparatus 102 may be configured to compute the offset term and the smoothening term. The minimization of the objective function is described in detail, for example, in FIG. 6. The refined second texture map may include a texture for the face portions occluded in the first color image 110 and a corresponding texture for such face portions may be absent or inaccurately represented in the first texture map. The generation of the second texture map and the refined second texture map is described in detail, for example, in FIG. 6.

The electronic apparatus 102 may be further configured to extract a first portion of the first texture map based on a first mask for the face of the user 116. The first portion of the first texture map may be extracted for a front face portion of the face of the user 116. The electronic apparatus 102 may be further configured to extract a second portion of the refined second texture map based on a second mask for the face of the user 116. The second portion of the second texture map may be extracted for a remnant face portion of the face of the user 116. The electronic apparatus 102 may be further configured to generate a final texture map based on a blend the first portion of the first texture map and the second portion of the second texture map. The lighting influence may be added back to the final texture map when the first portion of the first texture map is blended with the second portion of the second texture map. The final texture map may represent a complete texture of the face of the user 116 and a texture of the final texture map may be same or nearly same as the actual texture of the face of the user 116.

In accordance with an embodiment, the electronic apparatus 102 may be further configured to generate a textured 3D face model of the face of the user 116 by rendering the generated final texture map onto the un-textured 3D face model 114. The electronic apparatus 102 may be further configured to render the textured 3D model on a display device. The textured 3D face model of the face of the user 116 may realistically represent the face of the user 116. The textured 3D face model may be further utilized in a Virtual Reality (VR) or Augmented Reality (AR) environment to represent the face of the user 116. The application of the textured 3D face model of the face of the user 116 may also include animation in video games, Visual Effects (VFX), Computer-Generated Imagery (CGI), and a 3D model-based video conferencing.

Figure 2:
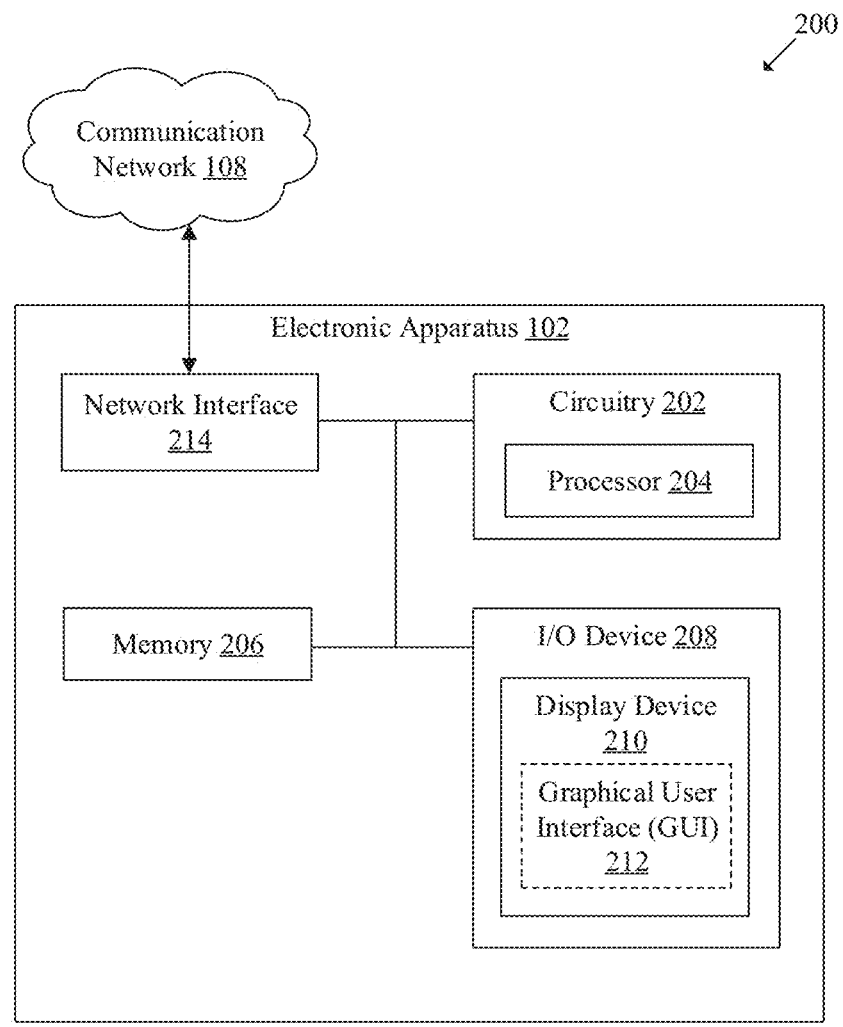
FIG. 2 is a block diagram that illustrates an exemplary electronic apparatus for facial texture map generation using a single color image and depth information, in accordance with an embodiment of the disclosure.

FIG. 2 is a block diagram that illustrates an exemplary electronic apparatus for facial texture map generation using a single color image and depth information, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202. The circuitry 202 may further include a processor 204. The electronic apparatus 102 may further include a memory 206 and an input/output (I/O) device 208. The I/O device 208 may include a display device 210 which may render a Graphical User Interface (GUI) 212. The electronic apparatus 102 may further include a network interface 214. The circuitry 202 may be communicatively coupled to the memory 206 and the I/O device 208. The circuitry 202 may be configured to communicate with the scanning device 104 and the server 106 by use of the network interface 214.

The processor 204 may comprise suitable logic, circuitry, and interfaces that may be configured to generate a first texture map of the face of the user 116 based on un-textured 3D face model 114, the first color image 110, and the depth information 112 of the face of the user 116. The processor 204 may be further configured to generate a second texture map of the face of the user 116 by texture model fitting of a reference facial texture model on the generated first texture map. The processor 204 may be further configured to refine the generated second texture map and generate a final texture map of the face of the user 116 based on a blend of the first texture map and the refined second texture map. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 206 may comprise suitable logic, circuitry, and interfaces that may be configured to store the first color image 110, the depth information 112, and the un-textured 3D face model 114. The memory 206 may be further configured to store the reference facial texture model, for example, a PCA model of facial texture maps from a plurality of faces different from the face of the user 116. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may comprise suitable logic, circuitry, and interfaces that may be configured to receive an input from a user (such as the user 116) and provide an output to the user based on the received input from the user. The I/O device 208 which may include various input and output devices, may be configured to communicate with the circuitry 202. Examples of the I/O device 208 may include, but are not limited to, a touch screen, a keyboard, a mouse, a joystick, a microphone, a display device (for example, the display device 210), and a speaker.

The display device 210 may comprise suitable logic, circuitry, and interfaces that may be configured to display the textured 3D face model of the face of the user 116. In some embodiments, the display device 210 may be an external display device associated with the electronic apparatus 102. The display device 210 may be a touch screen which may enable a user, such as the user 116, to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

The GUI 212 may correspond to a user interface (UI) rendered on a display device, such as the display device 210. The GUI 212 may be configured to display the textured 3D face model of the face of the user 116. Additionally, the GUI 212 may be further configured to display graphical elements that may correspond to user-selectable options for a view selection, a display control, and other interactive user-options. In some embodiments, the GUI 212 may be rendered on an external display screen communicatively coupled to the electronic apparatus 102.

The network interface 214 may comprise suitable logic, circuitry, and interfaces that may be configured to facilitate communication between the electronic apparatus 102, the scanning device 104, and the server 106, via the communication network 108. The network interface 214 may be implemented by use of various known technologies to support wired or wireless communication of the electronic apparatus 102 with the communication network 108. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 214 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operation of the circuitry 202 is described in detail, for example in FIGS. 3, 4, 5, 6, and 7.

Figure 3:
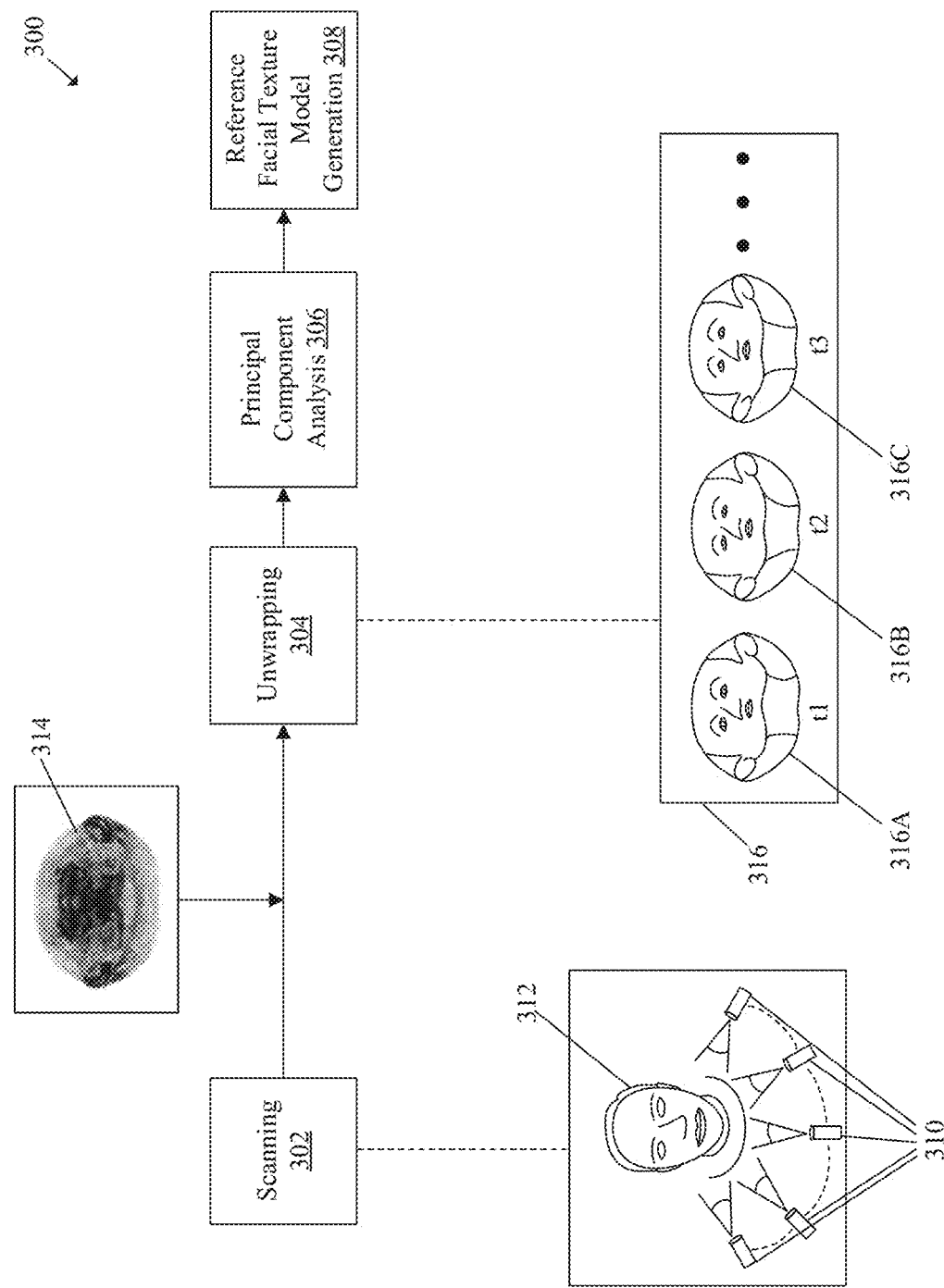
FIG. 3 illustrates exemplary operations for generation of a reference facial texture model, in accordance with an embodiment of the disclosure.

FIG. 3 illustrates exemplary operations for generation of a reference facial texture model, in accordance with an embodiment of the disclosure. FIG. 3 is described in conjunction with elements from FIG. 1 and FIG. 2. With reference to FIG. 3, there is shown a processing pipeline 300 that includes a set of operations for generation of a reference facial texture model.

At 302, a scanning operation is executed. In the scanning operation, a scanning device (same or different from the scanning device 104) may be configured to scan a plurality of faces that may be different from the face of the user 116. The scanning device may be configured to scan the plurality of faces from a plurality of viewpoints and under the common ambient lighting conditions, for example, a common white light background. The plurality of faces may be captured under common ambient lighting conditions so that a uniform texture of each face of the plurality of faces is captured. Each face of the plurality of faces may be captured with a uniform illumination for key facial features of the corresponding face.

As an example, the scanning device may be a high-resolution camera. The image sensor of the scanning device may be configured to capture the second plurality of images of the plurality of faces and the depth sensor may be further configured to capture the second depth information corresponding to the second plurality of color images. As another example, a plurality of scanning devices 310 may be configured scan a face 312 from a plurality of viewpoints. Each of the plurality of scanning devices 310 may be a high-resolution camera that may be configured to capture the second plurality of color images from the plurality of viewpoints, such that an entire face portion of each of the plurality of faces. The second plurality of color images may be high-resolution color images of the plurality of faces different from the face of the user 116 and each of the second plurality of color images may be a representation of an entire face portion of each of the plurality of faces different from the face of the user 116. The face 312 may be different from the face of the user 116. The processor 204 may be configured to generate a face mesh of each face (such as the face 312) of the plurality of faces based on the captured second plurality of color images and the corresponding second depth information. The face mesh of each of the plurality of faces may represent facial details of the corresponding face of the plurality of faces. The face mesh of each of the plurality of faces may be a 3D mesh that may be made up of a plurality of triangles. The face mesh of each face of the plurality of faces may include a plurality of vertices that may connect a set of triangles of the plurality of triangles of the face mesh. The face mesh of each face of the plurality of faces should be aligned with each other. Alternatively stated, the generated face mesh of each face of the plurality of faces should include equal number of triangles and vertices. Additionally, a vertex at a first position on a first face mesh of a first face and a corresponding vertex at a corresponding position on a second face mesh of a second face may represent a same facial point on the first face mesh and the second face mesh, respectively.

At 304, an unwrapping operation is executed. In the unwrapping operation, the processor 204 may be configured to unwrap the generated face mesh of each face of the plurality of faces with respect to a U-V coordinate map 314. The processor 204 may be configured to generate a plurality of facial texture maps 316 for the plurality of faces different from the face of the user 116. Each facial texture map of the plurality of facial texture maps 316 may be generated with respect to the U-V coordinate map 314. Each facial texture map of the plurality of facial texture maps 316 may be a 2D U-V coordinate map that may represent a facial texture of a corresponding face of the plurality of faces. For example, a first facial texture map 316A may represent the facial texture, such as a color and appearance of the skin and facial features (e.g., eyes, nose, lips, ears, etc.) of the face 312. Each facial texture map of the plurality of facial texture maps 316 may be aligned with each other.

At 306, a Principal Component Analysis (PCA) operation may be executed. In the PCA operation, the processor 204 may be configured to apply PCA on the plurality of facial texture maps 316. The PCA is a statistical procedure that may be utilized to identify and extract certain important uncorrelated data components from a large set of correlated data components. More specifically, the PCA may be utilized to extract texture information of certain important uncorrelated facial components from the plurality of facial texture maps 316. The processor 204 may be configured to estimate a mean facial texture based on the plurality of facial texture maps 316. The mean facial texture may be a mean of a plurality of facial textures of the plurality of faces different from the face of the user 116. The facial textures of the plurality of faces may be represented by the plurality of facial texture maps 316. For example, "$t_1$" may represent the first facial texture map 316A, "$t_2$" may represent a second facial texture map 316B, and "$t_3$" may represent a third facial texture map 316C. The mean facial texture may be estimated, for example, by equation (1), as follows:

$$T' = \Sigma_{n=1}^{N} t_n \qquad (1)$$

where, T' represents the mean facial texture; and $t_n$ represents a nth facial texture map of the plurality of facial texture maps 316.

The processor 204 may be further configured to compute a set of eigenvectors and a set of eigenvalues for each facial texture map of the plurality of facial texture maps 316. The set of eigenvectors and the set of eigenvalues may be computed, for example, by equation (2) and (3) as follows:

$$X = [t_1 - T', \ldots, t_n - T']^T \qquad (2)$$

$$X^T X = U_t \Sigma_t^T \Sigma_t U_t^T \qquad (3)$$

where,
  $U_t$ represents the eigenvectors and t represents texture (which means the eigenvectors and eigenvalues are for texture). It is a matrix where each column represents one eigenvector; and
  Σ is a diagonal matrix in which each value at the diagonal represents one Eigenvalue.

At 308, a reference facial texture model may be generated. The processor 204 may be configured to generate the reference facial texture model based on the application of PCA on the plurality of facial texture maps 316. The reference facial texture model may be a PCA model that corresponds to the plurality of faces different from the face of the user 116.

Figure 4:
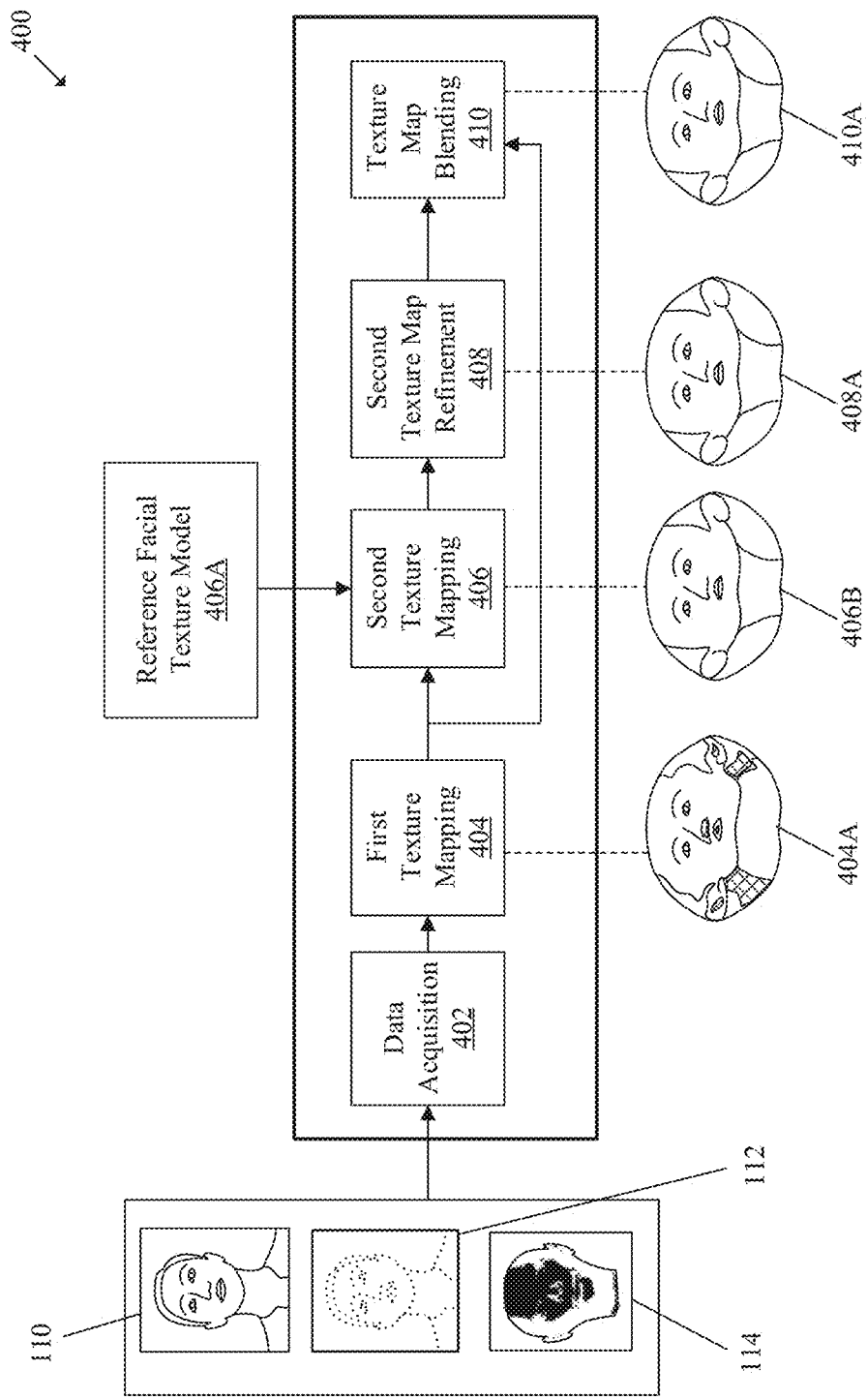
FIG. 4 illustrates exemplary operations for facial texture map generation using a single color image and depth information, in accordance with an embodiment of the disclosure.

FIG. 4 illustrates exemplary operations for facial texture map generation using a single color image and depth information, in accordance with an embodiment of the disclosure. FIG. 4 is described in conjunction with elements from FIGS. 1, 2, and 3. With reference to FIG. 4, there is shown a processing pipeline 400 to depict generation of a facial texture map using operations from 402 to 410.

At 402, a data acquisition operation is executed. In the data acquisition operation, the processor 204 may be configured to retrieve the first color image 110 and the depth information 112 corresponding to the first color image 110 of the face of the user 116 from the memory 206. The processor 204 may be further configured to retrieve the un-textured 3D face model 114 of the face of the user 116 from the memory 206. In some embodiments, the first color image 110, the depth information 112, and the un-textured 3D face model 114 may be stored on the server 106. In such cases, the processor 204 may be configured to retrieve the first color image 110, the depth information 112, and the un-textured 3D face model 114 from the server 106, via the communication network 108. The depth information 112 may be synchronized with the first color image 110 such that the first color image and the depth information 112 corresponding to the first color image 110 may be captured together at the same time and may represent the same field-of-view.

At 404, a first texture mapping operation may be executed. In the first texture mapping operation, the processor 204 may be configured to generate a first texture map 404A of the face of the user 116, based on the retrieved first color image 110, the depth information 112, and the un-textured 3D face model 114. The processor 204 may be configured to transform and map each triangle of a plurality of triangles on the first color image 110 to a corresponding triangle on a U-V coordinate map by using the un-textured 3D face model 114. The U-V coordinate map may depict texture information for a 3D model on a 2D layout. The first texture map 404A may be generated by a direct application of texture (or color information) from the retrieved first color image 110. The generation of the first texture map 404A is further described in details, for example, in FIG. 5. The generated first texture map 404A may include some regions for which texture information of certain occluded facial areas may be absent or unavailable in the first color image 110. For example, the occluded facial areas may include area behind ears, areas around the nose, or side regions around the neck.

At 406, a second texture mapping operation may be executed. In the second texture mapping operation, the processor 204 may be configured to retrieve a reference facial texture model 406A from the memory 206. The reference facial texture model 406A may correspond to the reference facial texture model of FIG. 3. The processor 204 may be further configured to generate a second texture map 406B of the face of the user 116. The processor 204 may be further configured to generate the second texture map 406B by texture model fitting of the reference facial texture model 406A on a plurality of first effective points on the generated first texture map 404A. The texture model fitting of the reference facial texture model 406A on the plurality of first effective points on the first texture map 404A is further described in detail, for example, in FIG. 6.

At 408, a second texture map refinement operation is executed. In the second texture map refinement operation, the processor 204 may be further configured to refine the second texture map 406B. The processor 204 may be configured to generate a refined second texture map 408A based on minimization of an objective function for the second texture map 406B. The processor 204 may be further configured to generate the refined second texture map 408A further based on a removal of the lighting influence from the generated first texture map 404A. The lighting influence in the first texture map 404A may be the lighting influence from external light sources that may be present in the first color image 110. The processor 204 may be configured to generate a refined second texture map 408A of the face of the user 116 such that a texture captured in the refined second texture map 408A is nearly same as the actual texture of the face of the user 116.

The generation of the second texture map 406B based on the texture model fitting shows more general information of the texture (since the texture model is extracted from a plurality of faces). The refinement is applied to ensure that the texture of the face appear in the refined second texture map 408A. For example, some faces may have moles and other faces may not have at same position. The refinement of the second texture map 406B is further described in detail, for example, in FIG. 6.

At 410, a texture map blending operation is executed. In the texture map blending operation, the processor 204 may be configured to blend the first texture map 404A and the refined second texture map 408A. The processor 204 may be further configured to generate a final texture map 410A based on blending of the first texture map 404A and the refined second texture map 408A. The processor 204 may be configured to extract a first portion from the first texture map 404A for a front face portion of the face of the user 116 and a second portion from the refined second texture map 408A for a remnant face portion of the face of the user 116. The processor 204 may be further configured to generate the final texture map 410A by blending the first portion of the first texture map 404A and the second portion of the refined second texture map 408A. The generation of the final texture map 410A is further described in details, for example, in FIG. 7.

Figure 5:
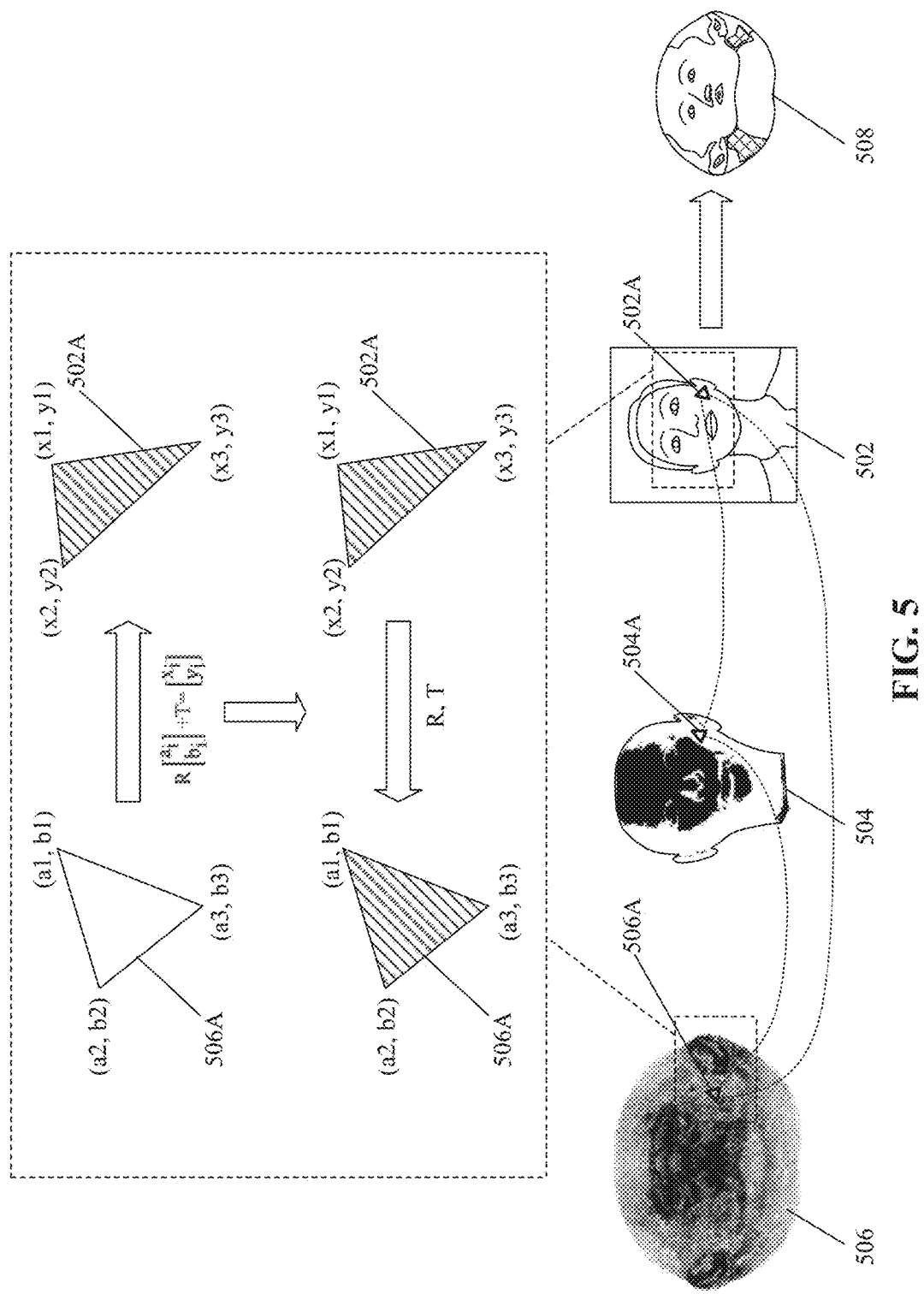
FIG. 5 illustrates exemplary operations for generation of a first texture map of a face of a user, in accordance with an embodiment of the disclosure.

FIG. 5 illustrates exemplary operations for generation of a first texture map of a face of a user, in accordance with an embodiment of the disclosure. FIG. 5 is explained in conjunction with elements from FIGS. 1, 2, 3, and 4. With reference to FIG. 5, there is shown a first color image 502, an un-textured 3D face model 504, a U-V coordinate map 506, and a first texture map 508. There is also shown a first triangle 502A on the first color image 502, a second triangle 504A on the un-textured 3D face model 504, and a third triangle 506A on the U-V coordinate map 506. The first color image 502 may correspond to the first color image 110 (as shown in FIG. 1). The un-textured 3D face model 504 may correspond to the un-textured 3D face model 114 (as shown in FIG. 1). The details of the first texture mapping operation are described herein.

The processor 204 may be configured to determine a first plurality of triangles on the first color image 502. The first plurality of triangles on the first color image 502 may include the first triangle 502A. The un-textured 3D face model 504 may include a second plurality of triangles that includes the second triangle 504A. The processor 204 may be further configured to map each triangle of the first plurality of triangles on the first color image 502 to a corresponding triangle of the second plurality of triangles on the un-textured 3D face model 504. The first plurality of triangles on the first color image 502 may be mapped to the corresponding second plurality of triangles on the un-textured 3D face model 504 based on a perspective projection of the first color image 502 on the un-textured 3D face model 504 in a 3D space. The perspective projection of each of the first plurality of triangles on the first color image 502 to a corresponding triangle of the second plurality of triangles on the un-textured 3D face model 504 may be based on a focal length of the image sensor 104A, a center of projection, and a distance between the image sensor 104A and the user 116. For example, the first triangle 502A on the first color image 502 may be mapped to the second triangle 504A on the un-textured 3D face model 504, based on the perspective projection.

The processor 204 may be further configured to determine a third plurality of triangles on the U-V coordinate map 506 by U-V coordinate mapping the second plurality of triangles of the un-textured 3D face model 504 on the U-V coordinate map 506. The processor 204 may be further configured to map the second plurality of triangles of the un-textured 3D face model 504 on the U-V coordinate map 506 based on a UV coordinate of each vertex of the U-V coordinate map 506. The UV coordinates represents a projection of X-Y-Z coordinates of a plurality of vertices of the un-textured 3D face model 504 in a 2D space. The determined third plurality of triangles on the U-V coordinate map 506 may include the third triangle 506A.

The processor 204 may be further configured to estimate a correspondence between the third plurality of triangles on the U-V coordinate map 506 and the first plurality of triangles on the first color image 502. The processor 204 may be further configured to compute an affine transformation between each triangle of the third plurality of triangles on the U-V coordinate map 506 and the corresponding triangle of the first plurality of triangles on the first color image 502. The affine transformation between each triangle of the third plurality of triangles on the U-V coordinate map 506 and the corresponding triangle of the first plurality of triangles on the first color image 502 may be computed, for example, by using equation (4) as follows:

$$R\begin{bmatrix} a_i \\ b_i \end{bmatrix} + T = \begin{bmatrix} x_i \\ y_i \end{bmatrix} \quad (4)$$

where, R and T represent the affine transformations;
($a_i$, $b_i$) represent coordinates of a vertex on the U-V coordinate map 506; and
($x_i$, $y_i$) represent coordinates of a vertex on the first color image 502.

As an example, the processor 204 may be configured to compute the affine transformation between the third triangle 506A on the U-V coordinate map 506 and the first triangle 502A on the first color image 502. The first triangle 502A may be represented by the vertices (a1, b1), (a2, b2), and (a3, b3). The third triangle 506A may be represented by the vertices (x1, y1), (x2, y2), and (x3, y3). The computed affine transformation may be applicable to each vertex of the third triangle 506A on the U-V coordinate map 506. The processor 204 may be further configured to interpolate color information from each triangle of the first plurality of triangles on the first color image 502 to the corresponding triangle on the U-V coordinate map 506. For example, the processor 204 may be configured to interpolate the color information from the first triangle 502A to the corresponding third triangle 506A.

The processor 204 may be further configured to apply a texture to each triangle of the third plurality of triangles on the U-V coordinate map 506, based on the computed affine transformation and the interpolation of the color information from the corresponding triangle of the first plurality of triangles on the first color image 502. For example, the processor 204 may be configured to apply a texture to the third triangle 506A, based on the computed affine transformation between the third triangle 506A and the first triangle 502A. The processor 204 may be configured to apply the texture to the third triangle 506A, further based on the interpolation of the color information of the first triangle 502A on the first color image 502 to the third triangle 506A on the U-V coordinate map 506. Similarly, the processor 204 may be further configured to determine a textured U-V coordinate map that corresponds to the first texture map 508, based on the application of texture to each triangle of the third plurality of triangles on the U-V coordinate map 506.

The first texture map 508 of the face of the user 116 may be utilized to determine a texture of a 3D face model of the face of the user 116. However, the first texture map 508 may not represent an overall facial texture of the face of the user 116, as the first color image 502 may only show a front view of the face of the user 116. The texture for some occluded regions of the face may not be captured in the first color image 502 and thus, may be absent in the first texture map 508. For example, the first texture map 508 may include some regions (shown with a pattern) that depict missing texture of the occluded regions of the face of the user 116.

Figure 6:
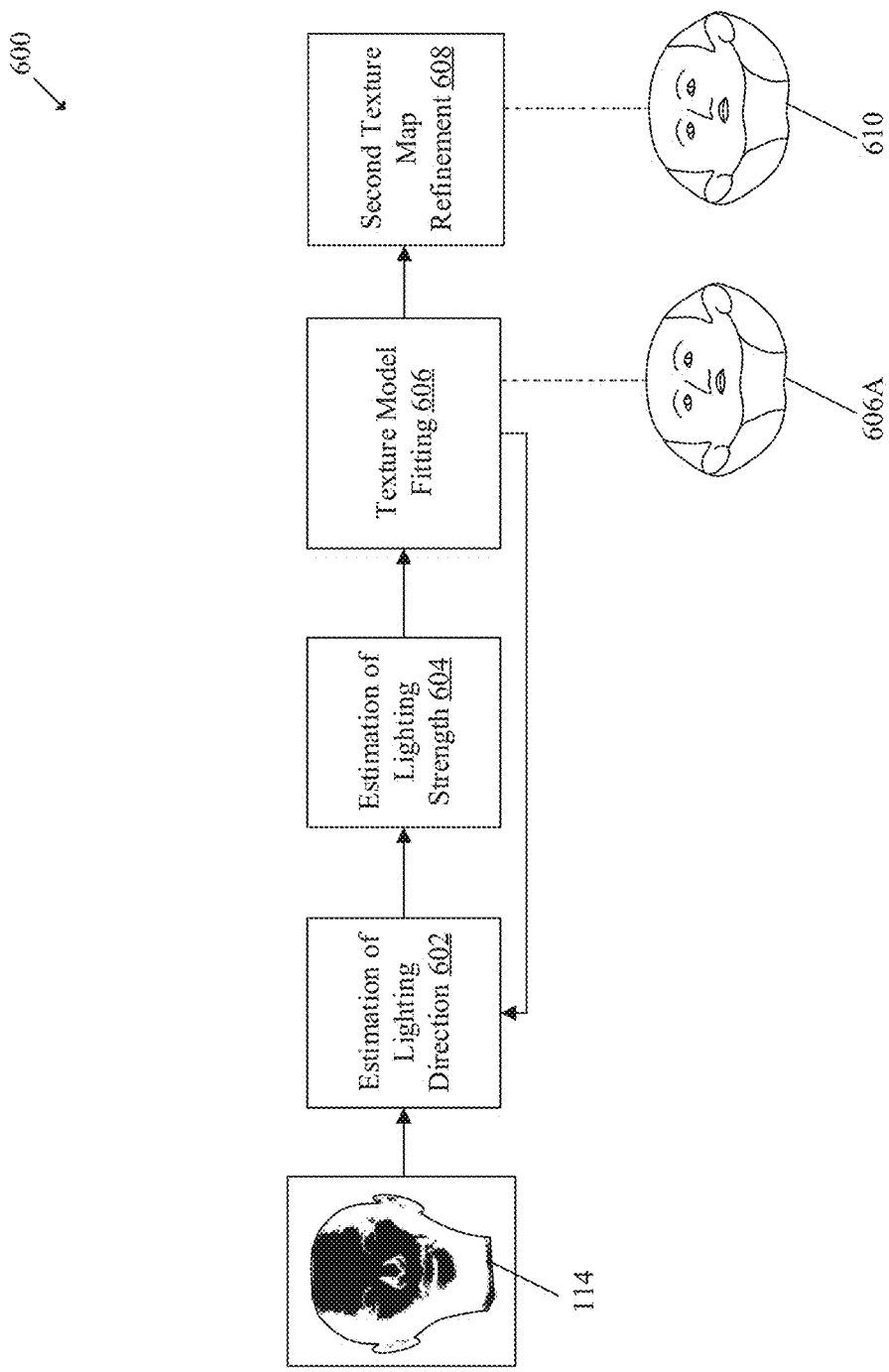
FIG. 6 illustrates exemplary operations for generation of a refined second texture map, in accordance with an embodiment of the disclosure.

FIG. 6 illustrates exemplary operations for generation of a refined second texture map, in accordance with an embodiment of the disclosure. FIG. 6 is explained in conjunction with elements from FIGS. 1, 2, 3, 4, and 5. With reference to FIG. 6, there is shown a processing pipeline 600 to depict generation of a refined second texture map using operations from 602 to 608.

At 602, an operation is executed for estimation of a lighting direction. In the operation, the processor 204 may be configured to iteratively estimate a lighting direction for the plurality of first effective points on a first texture map, such as the first texture map 508. The estimated lighting direction may be a lighting direction for the plurality of first effective points on the first texture map. Each effective point of the plurality of first effective points may be a point on the first texture map 508 for which a corresponding triangle may be present on the un-textured 3D face model 114. Additionally, each effective point of the plurality of first effective points may be a point on the first texture map 508 for which a corresponding point may be observed from the first color image 110.

It should be noted that the corresponding triangle may not be observed from the first color image 110. The first texture map 508 and the second texture map (for example, second texture map 606A of FIG. 6) may represent the texture for the same set of points and triangles which have correspondence on the un-textured 3D face model 114. The plurality of first effective points on the first texture map 508 may be mapped to vertices on the un-textured 3D face model 114 and to an observed region of the first color image 110. For the unobserved region, information on the first texture map 508 may not be effective.

The processor 204 may be configured to estimate the lighting direction for the plurality of first effective points on the first texture map 508 based on a reflectance model, the first texture map 508, and the un-textured 3D face model 114. The reflectance model may be an empirical model for illumination of points on a surface. An example of the reflectance model may be a Phong reflectance model. The reflectance model may illustrate a way a surface (e.g. the face of the user 116) may reflect light as a combination of ambient light, diffused light, and specular reflectance. The reflectance model may include a relationship between a lighting strength for each of the ambient light and the diffused light, a lighting direction, and a specular reflectance. The reflectance model may be represented, for example, using equation (5), equation (6), equation (7), and equation (8), as follows:

$$l(w) = (L_a * \varphi + (L_d * \rho) \times (Nd)_3 + (L_d * e) \quad (5)$$

$$L_a = [l_a^T, \ldots, l_a^T]^T \delta R^{3n \times 1} \quad (6)$$

$$L_d = [l_d^T, \ldots, l_d^T]^T \epsilon R^{3n \times 1} \quad (7)$$

$$(Nd)_3 = vec([N_d, N_d, N_d]^T) \quad (8)$$

where, $l_a$ represents a lighting strength of ambient light in red-green-blue (RGB) channels for the plurality of points;

$l_d$ represents a lighting strength of diffused light in the RGB channels for the plurality of points;

l(w) represents rendered texture of the face of the user 116;

n represents a number of points for the texture $1(w)$;

ρ represents an albedo value for each of the plurality of points;

d represents the lighting direction;

N represents a normal at each point of the plurality of points;

e represents a specular reflectance at each point of the plurality of points; and

* represents product by element.

The normal at each effective point of the first plurality of effective points may be a normal for its corresponding triangle on the un-textured 3D face model 114. The processor 204 may be further configured to estimate the lighting direction from the first color image 110 for the plurality of first effective points, iteratively. In a first iteration, the lighting direction may be estimated without taking into account the specular reflectance and the ambient light. In the first iteration, the mean facial texture of the reference facial texture model 406A is considered as the albedo value "p" for each of the plurality of first effective points. Further, in the first iteration, a lighting strength for a red channel, a green channel, and a blue channel of the diffused light (also represented as "$l_d$") may be considered to have the same value, for example "1". The lighting direction in the first iteration may be estimated based on minimization of a first objective function, for example an objective function depicted by equation (9), as follows:

$$\min_{d}\|I_{ref} - \rho * L_a - (A*N_3)d - L_d*e\|^2 \qquad (9)$$

where, $I_{ref}$ represents reference color information (for e.g., RGB information) of the first color image 110; and
$A=[L_d*\rho, L_d*\rho, L_d*\rho]\in R^{3n\times 3}$ that represents concatenation of matrices. "A" may be used for the other iterations. For each column, it stores the results that multiply the strength of 3 channels of the diffuse light to the 3 channels of albedo for all the vertices (3n). And "A" just duplicates such column 3 times.

In the first iteration, the first objective function as depicted by equation (9) may be reformatted and may be represented by equation (10), as follows:

$$\min_{d}\|I_{ref} - (B*N_3)d\|^2 \qquad (10)$$

where, B=[ρ, ρ, ρ] when $L_d$=[1, 1, 1];

N represents a normal at each effective point of the plurality of first effective points;

$N_3$ duplicates each row of N three times; and $d=((B*N_3)^T(B*N_3))^{-1}(B*N_3)^T I_{ref}$ and represents the lighting direction for the plurality of first effective points.

The processor 204 may be further configured to apply a first constraint while minimizing the first objective function represented by equation (9). The first constraint may consider that a direction of light is from outside of the face to a surface of the face. The first constraint may be represented by "$N_3*d>0$". The processor 204 may be further configured to apply a second constraint while minimizing the first objective function represented by equation (9). The second constraint may consider that the lighting strength is positive or greater than "0". The second constraint may be represented by "$l_a>0$". For the reformatted first objective function represented by equation (10), the second constraint may be represented as "$l_a=0$".

For subsequent iterations, the processor 204 may be further configured to estimate the lighting direction based on a minimization of a second objective function. For example, the second objective function may be represented by equation (11), as follows:

$$\min_{d}\|I_{ref} - \rho*L_a - (A*N_3)d - L_d*e\|^2 \qquad (11)$$

The values of $l_a$, $l_d$, ρ, d, and e in the subsequent iterations are considered from a previous iteration. A closed form solution of the second objective function may be given, for example, by equation (12), as follows:

$$d=((A*N_3)^T(A*N_3))^{-1}(A*N_3)^T(I_{ref}-\rho*L_a-L_d*e) \qquad (12)$$

where, d represents the lighting direction from the first color image for the plurality of first effective points for a particular iteration.

The processor 204 may be further configured to estimate the specular reflectance for each effective point of the plurality of first effective points based on the estimated lighting direction. The specular reflectance may be a mirror reflection of a plurality of light waves from the plurality of first effective points on a surface of the face of the user 116. The specular reflectance may be estimated, for example, by using equation (13), as follows:

$$e_i = k_s \langle v_i, r_i \rangle^\gamma \qquad (13)$$

where, $e_i$ represents the specular reflectance at an effective point "i";

$k_s$ is a constant for the specular reflectance;

$v_i$ represents a viewing direction of an effective point "i";

γ represents a constant for shininess of a facial surface in the first color image 110;

$\langle , \rangle$ represents an inner product;

$r_i=2 \langle n_i, d \rangle n_i - d$ and represents reflection direction of the effective point "i";

d represents the estimated lighting direction at the effective point "i"; and ni represents a normal at the effective point "i". ks and γ are determined by the facial skin reflectance property, which is similar for different people. They are assumed constant over the whole facial region. For the sake of simplicity, we assume that ks and γ are same for three color channels.

At 604, an operation is executed for an estimation of lighting strength. In this operation, the processor 204 may be further configured to estimate the lighting strength for the ambient light and the diffused light for the plurality of first effective points. The lighting strength for each of the ambient light and the diffused light for the plurality of effective points may be estimated based on at least the estimated lighting direction in each iteration. The processor 204 may be further configured to estimate the lighting strength for a plurality of color channels of each of the ambient light and the diffused light. The lighting strength may be a strength of light that may be reflected by each effective point of the plurality of first effective points on the first texture map 508. For example, the lighting strength of a red channel of each of the ambient light and the diffused light for each effective point of the plurality of first effective points may be estimated based on minimization of a first objective function. The first objective function may be represented, for example, by using equation (14) as follows:

$$\min_{l_{ad}^r} \|I_{ref,r} - Cl_{ad}^r\|^2 \quad (14)$$

where, $I_{ref,r}$ represents reference color information for the red channel of the first color image 110;
$C=[\rho^r, \rho^{r*}(N_d)+e^r]\epsilon R^{n\times 2}$ and represents concatenation of matrices to simplify the expression without specific meaning;
$\rho^r$ represents the red channel of the albedo ($\rho$) for each of the plurality of first effective points;
$e^r$ represents the red channel of the specular reflectance (e) at each of the plurality of first effective points; and
$l_{ad}^r=(l_a^r,l_d^r)^T$ is the lighting strength of the red channel of each of the ambient light and the diffused light. The closed form solution of the first objective function may be represented may be given by, for example, equation (15), as follows:

$$l_{ad}^r=(C^TC)^{-1}C^TI_{ref,r} \quad (15)$$

The processor 204 may be further configured to estimate the lighting strength for a green channel and a blue channel of each of the ambient light and the diffused light for the plurality of first effective points. For example, the lighting strength of the green channel may be estimated based on minimization of a second objective function. The second objective function may be represented, for example, by using equation (16) as follows:

$$\min_{l_{ad}^g} \|I_{ref,g} - Cl_{ad}^g\|^2 \quad (16)$$

where, $I_{ref,g}$ represents reference color information for the green channel of the first color image 110;
$C=[\rho^g, \rho g*(N_d)+e^g]\epsilon R^{n\times 2}$ and represents concatenation of matrices;
$\rho^g$ represents the green channel of the albedo ($\varphi$ for each of the plurality of first effective points;
$e^g$ represents the green channel of the specular reflectance (e) at each of the plurality of first effective points; and
$l_{ad}^g=(l_a^g,l_d^g)^T$ is the lighting strength of the green channel of each of the ambient light and the diffused light. The closed form solution of the second objective function may be given by, for example, equation (17), as follows:

$$l_{ad}^g=(C^TC)^{-1}C^TI_{ref,g} \quad (17)$$

As an example, the lighting strength of the blue channel of each of the ambient light and the diffused light for each effective point of the plurality of first effective points may be estimated based on minimization of a third objective function. The third objective function may be represented, for example, by equation (18), as follows:

$$\min_{l_{ad}^b} \|I_{ref,b} - Cl_{ad}^b\|^2 \quad (18)$$

where, $I_{ref,b}$ represents reference color information for the blue channel of the first color image 110;
$C=[\rho^b, \rho^{b*}(N_d)+e^b]\epsilon R^{n\times 2}$ and represents concatenation of matrices;
$\rho^b$ represents the blue channel of the albedo (p) for each of the plurality of first effective points;
$e^b$ represents the blue channel of the specular reflectance (e) at each of the plurality of first effective points; and
$l_{ad}^b=(l_a^b,l_d^b)^T$ is the lighting strength of the blue channel of each of the ambient light and the diffused light. The closed form solution of the third objective function may be given, for example, by equation (19), as follows:

$$l_{ad}^b=(C^TC)^{-1}C^TI_{ref,b} \quad (19)$$

At 606, a texture model fitting operation is executed. In the operation, the processor 204 may be further configured to estimate a set of albedo values for a plurality of points on the first texture map 508. The set of albedo values may be estimated based on the reference facial texture model 406A, the estimated lighting strength for each of the ambient light and the diffused light, the lighting direction, and the specular reflectance. The estimated set of albedo values may be a set of reconstructed albedo values that may correspond to a real facial texture of the face of the user 116. The set of albedo values may be reconstructed from the reference facial texture model 406A and the first texture map 508. The reference facial texture model 406A may be a combination of the plurality of eigenvectors and eigenvalues extracted by application of PCA on the plurality of facial texture maps of the plurality of faces different from the face of the user 116. The set of albedo values may be estimated, for example, by using equation (20), as follows:

$$\rho = \overline{T} + U_T \Sigma_T \beta \quad (20)$$

where, $\rho$ represents an albedo value of an effective point;
$\overline{T}$ represents the mean facial texture of the plurality of facial texture maps of the plurality of faces;
$U_T$ represents an orthonormal basis;
$\Sigma_T$ represents eigenvalues of the plurality of facial texture maps of the plurality of faces; and
$\beta$ represents a coefficient for the eigenvectors extracted by application of PCA on the plurality of facial texture maps of the plurality of faces utilized to generate the reference facial texture model 406A.

The processor 204 may be further configured to estimate the coefficient for each of the plurality of eigenvectors extracted by application of PCA on the plurality of facial texture maps of the plurality of faces different from the face of the user 116. The coefficient for each of the plurality of facial texture maps may be estimated based on the estimated lighting direction, the estimated lighting strength and the specular reflectance. The coefficient for each of the plurality of eigenvectors extracted by application of PCA on the plurality of facial texture maps may be estimated based on minimization of an objective function. The objective function may be represented, for example, by an equation (21), given as follows:

$$\min_{\beta} \|I_{ref} - (\overline{T} + T\beta)*L_a - (\overline{T} + T\beta)*L_d*N_3d - L_d*e\|^2 + \lambda_2\|\beta./\sigma_t\|^2 \quad (21)$$

where, T represents a target texture;
$\lambda$ represents a parameter for weights associated with the eigenvectors; and
$\sigma_t$ represents eigenvalues of a PCA model, the values at the diagonal of $\Sigma_T$ (from the PCA on the plurality of facial texture maps). The closed form solution for the objective function may be given, for example, by equation (22), as follows:

$$\beta = (T^T T + \Sigma_t)^{-1} T^T (a' - \bar{\rho}) \qquad (22)$$

where, $a' = (I_{ref} - l_d{}^* e) \cdot /(l_a + l_d{}^* (N_3 d))$; and $$\sum_t \text{diag}\left(\frac{\lambda_2}{\sigma_{1 \cdot t}^2}, \ldots, \frac{\lambda_2}{\sigma_{m-1 \cdot t}^2}\right)$$

The processor 204 may be further configured to generate the second texture map 606A based on the determined set of albedo values. The generated second texture map 606A may include the determined set of albedo values. The generated second texture map 606A may include a reconstructed texture for the plurality of occluded regions for which a texture may be absent or inaccurately represented in the first texture map 508.

At 608, an operation is executed for refinement of the second texture map 606A. In the operation, the processor 204 may be further configured to refine the generated second texture map 606A based on a removal of a lighting influence from a plurality of first effective points on the generated first texture map 508. Since the first texture map 508 is generated based on first color image 502, the first texture map 508 may also include the lighting influence from some external light sources that may be present in the first color image 502. The processor 204 may be further configured to remove the lighting influence from the first texture map 508 and utilize the first texture map as a reference to refine the second texture map 606A. The processor 204 may be further configured to refine the second texture map 606A based on the first texture map 508 without the lighting influence, to reconstruct the albedo values of the second texture map 606A which are same as or nearly same as a real albedo value of the face of the user 116. The lighting influence from each of the plurality of first effective points on the first texture map 508 may be removed, for example, by using equation (23), given as follows:

$$a' = (I_{ref} - L_d{}^* e) \cdot /(L_a + L_d{}^* (N_3 d)) \qquad (23)$$

where, a' represents a texture of the plurality of first effective points on the first texture map 508 after removal of the lighting influence.

The goal of the refinement (i.e. 608) is to make the second texture map 606A for the albedo closer to a real albedo of the face, for example, to address moles or some other specific appearance features. From equation (23), a' may be estimated as a reference for the refinement at 608. The removal of the lighting influence may be performed to remove a lighting influence of the reference and to ensure that the second texture map 606A is closer to the reference.

The processor 204 may be further configured to compute an offset term for a plurality of points on the second texture map 606A. The offset term may be computed based on a first relationship for a first plurality of correspondences between the plurality of points on the first texture map 508 and the plurality of points on the second texture map 606A. The offset term may be computed, for example, by using equation (24), given as follows:

$$\sum_{i=1}^{n} (\Delta t_i - (a_i' - \rho_i))^2 \qquad (24)$$

where, $\Delta t_i$ represents an objective difference of an albedo for a point "i" on the second texture map 606A and a corresponding point on the refined second texture map; $a'_i$ represents a texture of the point "i" on the first texture map 508 after removal of the lighting influence;

$\rho_i$ represents albedo of the point "i" on the second texture map 606A; and n represents a number of points.

The processor 204 may be further configured to compute a smoothening term for a plurality of points on the second texture map 606A. The smoothening term may be computed based on a second relationship for a second plurality of correspondences between neighboring points of the plurality of points on the second texture map 606A. The smoothening term may be computed, for example, by using an equation (25), given as follows:

$$w \sum_{i,j \in N} (\Delta t_i - \Delta t_j)^2 \qquad (25)$$

where, $\Delta t_i$ represents an objective difference of an albedo for a point "i" on the second texture map 606A and the corresponding point on a refined second texture map;

$\Delta t_j$ represents an objective difference of an albedo for an effective point "j" on the second texture map 606A and the corresponding effective point on the refined second texture map;

w represents a parameter for weights; and i,j∈N represents the effective point "i" and the effective point "j" are neighbors.

The processor 204 may be further configured to generate a refined second texture map 610 based on a minimization of an objective function that is a combination of the offset term and the smoothening term. The refined second texture map 610 may be generated by the objective function given by equation (26), as follows:

$$\min_{\Delta t_1, \ldots, \Delta t_N} \sum_{i=1}^{n} (\Delta t_i - (a_i' - \rho_i))^2 + w \sum_{i,j \in N} (\Delta t_i - \Delta t_j)^2 \qquad (26)$$

where, N represents a number of points on the second texture map 606A.

The refined second texture map 610 may include a refined texture for the plurality of occluded regions of the face of the user 116 for which the texture was absent or inaccurately represented in first texture map 508. The processor 204 may be further configured to add the lighting influence of the first texture map 508 to the refined second texture map 610. The refined second texture map 610 with the lighting influence of the first texture map 508 may represent the actual texture of the face of the user 116 that may be captured in the first color image 110.

Figure 7:
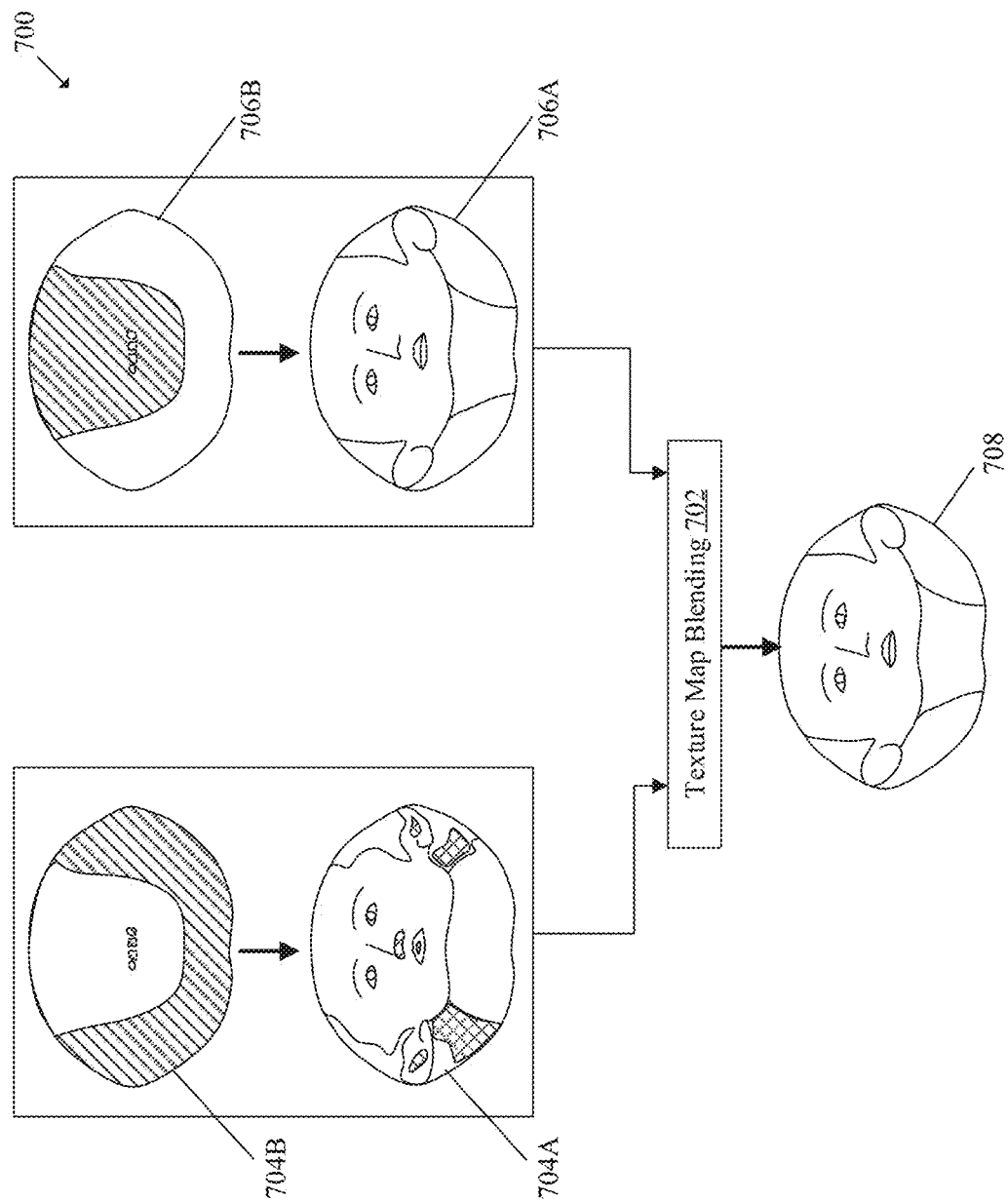
FIG. 7 illustrates exemplary operations for generation of a final texture map for a face of a user, in accordance with an embodiment of the disclosure.

FIG. 7 illustrates exemplary operations for generation of a final texture map for a face of a user, in accordance with an embodiment of the disclosure. FIG. 7 is explained in conjunction with elements from FIGS. 1, 2, 3, 4, 5, and 6. With reference to FIG. 7, there is shown a processing pipeline 700 for generation of a final texture map for the face of the user 116. There is further shown a first texture map 704A, a first mask 704B, a refined second texture map 706A, a second mask 706B, and a final texture map 708. The first texture map 704A may correspond to the first texture map 508 of FIG. 5. The refined second texture map 706A may correspond to the refined second texture map 610 of FIG. 6. The details of the texture map blending operation (as described in FIG. 4) is further presented herein.

The processor 204 may be configured to extract a first portion of the first texture map 704A based on application of the first mask 704B on the first texture map 704A. The first portion may correspond to a front face portion, such as the eyes, nose, and lips, of the face of the user 116. Since the first texture map 704A is generated based on the first color image 110, the first texture map 704A may represent an accurate or nearly accurate texture for the front face portion of the face of the user 116. The processor 204 may be further configured to extract the first portion of the first texture map 704A for a texture of the front face portion, such as the eyes, nose, and lips, of the face of the user 116. The processor 204 may be further configured to extract a second portion of the refined second texture map 706A based on application of the second mask 706B on the refined second texture map 706A. The second portion may correspond to a remnant face portion of the face of the user 116. The texture for the remnant face portion may be absent or inaccurately represented in the first texture map 704A due to occlusions in the remnant face portion, such as the ears and the neck, in the first color image 110. The refined second texture map 706A may include a reconstructed texture for the remnant portion of the face of the user 116. The processor 204 may be further configured to extract the second portion of the refined second texture map 706A for a texture of the remnant face portion, such as the ears and the neck.

The processor 204 may be further configured to assign a weight to the first mask 704B and the second mask 706B to generate the final texture map 704. The final texture map 708 may be generated, for example, by using equation (27), given as follows:

$$M(i)=T_2(i)*(1-w_i)+T_1(i)*w_i \quad (27)$$

where, M(i) represents a value of texture of a pixel "i" on the final texture map 708;
$T_1$ represents a texture of the first texture map 704A;
$T_2$ represents a texture of the refined second texture map 706A; and
$w_i$ represents the assigned weight. As an example, the value of $w_i$ may be set to be "1" when the first portion of the first texture map 704A is to be extracted. Similarly, the value of $w_i$ may be set to be "0" when the second portion of the refined second texture map 706A is to be extracted. The value of $w_i$ may be gradually varied for regions of the face that may be at a boundary of the front face portion and the remnant face portion. The generated final texture map 708 may represent the actual texture of the face of the user 116 or nearly represent the actual texture of the face of the user 116.

Figure 8:
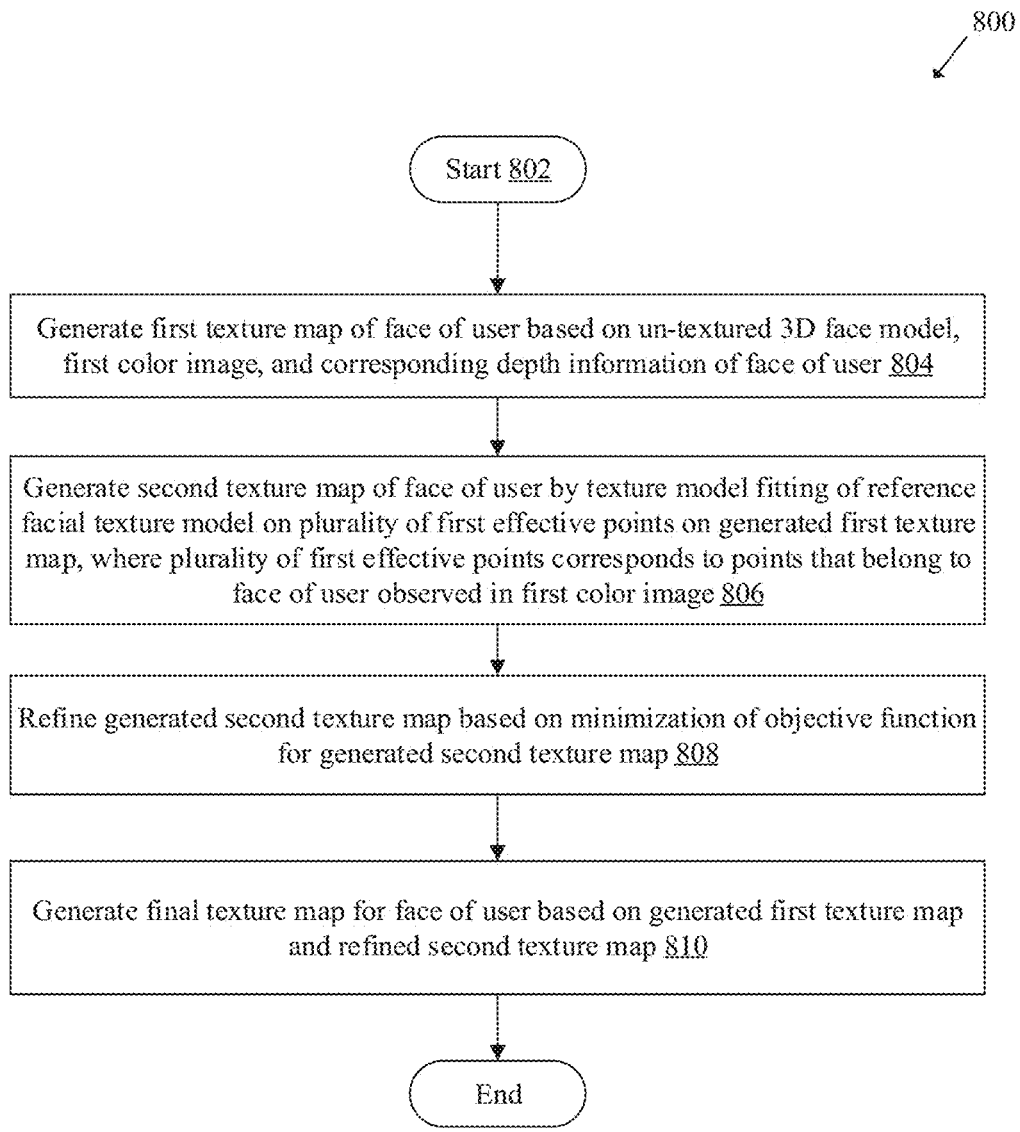
FIG. 8 is a flowchart that illustrates an exemplary method for facial texture map generation using a single color image and depth information, in accordance with an embodiment of the disclosure.

FIG. 8 depicts a flowchart that illustrates an exemplary method for facial texture map generation using a single color image and depth information, in accordance with an embodiment of the disclosure. FIG. 8 is described in conjunction with elements from FIGS. 1, 2, 3, 4, 5, 6, and 7. With reference to FIG. 8, there is shown a flowchart 800. The operations of the flowchart 800 may be executed in the electronic apparatus 102. The operations may start at 802 and proceed to 804.

At 804, the first texture map 508 of the face of the user 116 may be generated based on the un-textured 3D face model 114, the first color image 110, and the corresponding depth information 112 of the face of the user 116. The processor 204 may be configured to generate the first texture map 508, based on mapping of each the first plurality of triangles on the first color image 110 to the corresponding triangle of the second plurality of triangles on the un-textured 3D face model 114. The processor 204 may be further configured to compute the affine transformation between the third plurality of triangles on the U-V coordinate map (such as the U-V coordinate map 506) and the first plurality of triangles on the first color image 110. The processor 204 may be further configured to generate the first texture map 508 by application of texture on each of the third plurality of triangles of the U-V coordinate map 506. The texture may be applied on each of the third plurality of triangles based on the computed affine transformation and interpolation of color information of each of the first plurality of triangles of the first color image 110. The generation of the first texture map 508 is described, for example, in FIG. 5.

At 806, the second texture map 606A of the face of the user 116 may be generated by texture model fitting of the reference facial texture model 406A on a plurality of first effective points on the generated first texture map 508. The plurality of first effective points may correspond to points that belong to the face observed in the first color image 110. The processor 204 may be configured to generate the second texture map 606A of the face of the user 116 by texture model fitting of the reference facial texture model 406A on a plurality of first effective points on the generated first texture map 508. The generation of the second texture map 606A is described, for example, in FIG. 6.

At 808, the generated second texture map 606A may be refined based on minimization of an objective function for the generated second texture map 606A. The processor 204 may be further configured to refine the second texture map 606A based on the minimization of the objective function for the second texture map 606A. The processor 204 may be further configured to refine the second texture map 606A based on a removal of a lighting influence from the generated first texture map 508. The generation of the refined second texture map 610 is described, for example, in FIG. 6. The processor 204 may be further configured to add the lighting influence of the first texture map 508 back to the refined second texture map 610.

At 810, the final texture map 708 may be generated for face of the user 116 based on the generated first texture map 508 and the refined second texture map 610. The processor 204 may be configured to generate the final texture map 708 based on the generated first texture map 508 and the refined second texture map 610. The processor 204 may be further configured to extract the first portion of the first texture map 508 based on the first mask 704B for the face of the user 116. The processor 204 may be further configured to extract the second portion of the refined second texture map 610 based on the second mask 706B for the face of the user 116. The final texture map 708 may represent a texture map that may be same as or nearly same as the actual texture of the face of the user 116. The generation of the final texture map 708 for the face of the user 116 is described, for example, in FIG. 7. The control may pass to end.

Various embodiments of the disclosure may provide a non-transitory, computer-readable medium and/or storage medium, and/or a non-transitory machine readable medium and/or storage medium stored thereon, instructions executable by a machine and/or a computer, such as an electronic apparatus, for facial texture map generation using a single color image and depth information. The at least one code section may cause the machine and/or computer to perform operations that include storage of a first color image and corresponding depth information of a face of a user, an un-textured three-dimensional (3D) face model of the face of the user, and a reference facial texture model. The reference facial texture model may be a Principal Component Analysis (PCA) model of a plurality of facial texture maps for a plurality of faces different from the face of the user. The operations further include generation of a first texture map of the face of the user based on the un-textured 3D face model, the first color image, and the corresponding depth information of the face of the user. The operations further include generation of a second texture map of the face of the user by texture model fitting of the reference facial texture model on a plurality of first effective points on the generated first texture map. The plurality of first effective points corresponds to points that belong to the face of the user observed in the first color image. The operations further include refinement of the generated second texture map based on minimization of an objective function for the generated second texture map. The operations further include generation of a final texture map for face of the user based on the generated first texture map and the refined second texture map.

Exemplary aspects of the disclosure may include the electronic apparatus 102 that includes circuitry 202 and a memory 206. The memory 206 may be configured to store a first color image 110 and corresponding depth information 112 of a face of a user 116, an un-textured three-dimensional (3D) face model 114 of the face of the user 116, and a reference facial texture model. The reference facial texture model may be a Principal Component Analysis (PCA) model of a plurality of facial texture maps for a plurality of faces different from the face of the user 116. The circuitry 202 may be configured to generate a first texture map 508 of the face of the user 116 based on the un-textured 3D face model 114, the first color image 110, and the corresponding depth information 112 of the face of the user 116. The circuitry 202 may be further configured to generate a second texture map 606A of the face of the user 116 by texture model fitting of the reference facial texture model on a plurality of first effective points on the generated first texture map 508. The plurality of first effective points may correspond to points that belong to the face of the user 116 in the first color image 110. The circuitry 202 may be further configured to refine the generated second texture map 606A based on minimization of an objective function for the generated second texture map 606A. The circuitry 202 may be further configured to generate a final texture map 708 for face of the user 116 based on the generated first texture map 508 and the refined second texture map 610.

In accordance with an embodiment, the un-textured 3D face model 114 may be a shape-refined 3D face model of the face of the user 116. The PCA model may correspond to a combination of eigenvectors and eigenvalues that are extracted by application of PCA on the plurality of facial texture maps for the plurality of faces different from the face of the user. The electronic apparatus 102 may further include a scanning device 104 configured to capture a first plurality of color images of the face of the user 116 and first depth information corresponding to the first plurality of color images. The first plurality of color images and the corresponding first depth information includes the first color image 110 and the corresponding depth information 112. The circuitry 202 may be further configured to generate the un-textured 3D face model 114 of the face of the user 116 based on the captured first plurality of color images and corresponding first depth information.

In accordance with an embodiment, the scanning device 104 may be further configured to capture a second plurality of color images and corresponding second depth information of the plurality of faces different from the face of the user 116. The captured second plurality of color images of the plurality of faces are captured under a common ambient lighting condition. The circuitry 202 may be further configured to generate a face mesh of each of the plurality of faces based on the captured second plurality of color images, wherein the face mesh of each of the plurality of faces is aligned with each other. The circuitry 202 may be further configured to generate each facial texture map of the plurality of facial texture maps for a corresponding face of the plurality of faces based on unwrap of the generated face mesh of the corresponding face of the plurality of faces on a U-V coordinate map. The circuitry 202 may be further configured to generate the reference facial texture model by application of Principal Component Analysis (PCA) on the plurality of facial texture maps for the plurality of faces different from the face of the user 116.

In accordance with an embodiment, the circuitry 202 may be further configured to determine a first plurality of triangles on the first color image 110. The circuitry 202 may be further configured to map each triangle of the first plurality of triangles on the first color image 110 to a corresponding triangle of a second plurality of triangles on the un-textured 3D face model 114. The mapping may be based on a perspective projection of the first color image 110 on the un-textured 3D face model 114 in a 3D space. The circuitry 202 may be further configured to determine a third plurality of triangles on a U-V coordinate map 506 by U-V coordinate mapping the second plurality of triangles on the U-V coordinate map 506. The circuitry 202 may be further configured to compute an affine transformation between the third plurality of triangles on the U-V coordinate map 506 and the first plurality of triangles on the first color image 110. The circuitry 202 may be further configured to determine a textured U-V coordinate map by application of texture to each triangle of the third plurality of triangles. The application of texture to each triangle may be based on the computed affine transformation and the textured U-V coordinate map may be the first texture map 508. The application of the texture to each triangle of the third plurality of triangles on the U-V coordinate map 506 may be further based on interpolation of color information from a corresponding triangle of the first plurality of triangles on the first color image 110.

In accordance with an embodiment, the circuitry 202 may be further configured to iteratively, estimate a lighting strength for each of an ambient light and a diffused light, a lighting direction, and a specular reflectance for the first texture map 508. The lighting strength of the ambient light and the diffused light, the lighting direction, and the specular reflectance for the first texture map 508 may be estimated, based on a reflectance model, the first texture map 508, and the un-textured 3D face model 114. The reflectance model may include a relationship between the lighting strength for each of the ambient light and the diffused light, the lighting direction, and the specular reflectance. The circuitry 202 may be further configured to estimate a set of albedo values for a plurality of points on the first texture map 508, based on the reference facial texture model, the estimated lighting strength for each of the ambient light and the diffused light, the lighting direction, and the specular reflectance. Each effective point of the plurality of first effective points on the generated first texture map 508 may be a point for which a triangle is observed at a corresponding position on the un-textured 3D face model 114.

In accordance with an embodiment, the circuitry 202 may be further configured to compute an offset term for a plurality of points on the second texture map 606A based on a first relationship for a first plurality of correspondences between the plurality of points on the first texture map 508 and the plurality of points on the second texture map 606A. The circuitry 202 may be further configured to compute a smoothening term for a plurality of points on the second texture map 606A based on a second relationship for a second plurality of correspondences between neighboring points of the plurality of points on the second texture map 606A. The circuitry 202 may be further configured to minimize the objective function based on the computed offset term and the computed smoothening term. The circuitry 202 may be further configured to refine the second texture map 606A further based on a removal of a lighting influence from the generated first texture map 508. The circuitry 202 may be further configured to add the lighting influence of the first texture map to the refined second texture map.

In accordance with an embodiment, the circuitry 202 may be further configured to extract a first portion of the first texture map 508 based on a first mask 704B for the face of the user 116. The circuitry 202 may be further configured to extract a second portion of the refined second texture map 610 based on a second mask 706B for the face of the user 116. The circuitry 202 may be further configured to generate the final texture map 708 based on a combination of the extracted first portion and the extracted second portion. The first portion may correspond to a front face portion of the face of the user 116 and the second portion may correspond to a remnant face portion of the face of the user 116. The circuitry 202 may be further configured to generate a textured 3D face model of the face of the user 116 by rendering the generated final texture map 708 onto the un-textured 3D face model 114.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
  circuitry configured to:
    generate a first texture map of a face of a user based on an un-textured 3D face model, a first color image, and corresponding depth information of the face of the user;
    generate a second texture map of the face of the user by a texture model fitting process of a reference facial texture model on a plurality of first effective points on the generated first texture map, wherein
      the reference facial texture model is a Principal Component Analysis (PCA) model of a plurality of facial texture maps for a plurality of faces different from the face of the user, and
      the plurality of first effective points corresponds to points that belong to the face of the user observed in the first color image;
    refine the generated second texture map based on minimization of an objective function for the generated second texture map;
    extract a first portion of the first texture map based on a first mask for the face of the user;
    extract a second portion of the refined second texture map based on a second mask for the face of the user; and
    generate a final texture map for the face of the user based on a combination of the extracted first portion and the extracted second portion.

2. The electronic apparatus according to claim 1, wherein the un-textured 3D face model is a shape-refined 3D face model of the face of the user.

3. The electronic apparatus according to claim 1, wherein the PCA model corresponds to a combination of eigenvectors and eigenvalues that are extracted by application of PCA on the plurality of facial texture maps for the plurality of faces different from the face of the user.

4. The electronic apparatus according to claim 1, further comprising a scanning device configured to capture a first plurality of color images of the face of the user and first depth information corresponding to the first plurality of color images,
  wherein the first plurality of color images and the corresponding first depth information includes the first color image and the corresponding depth information.

5. The electronic apparatus according to claim 4, wherein the circuitry is further configured to generate the un-textured 3D face model of the face of the user based on the captured first plurality of color images and corresponding first depth information.

6. The electronic apparatus according to claim 1, further comprising a scanning device configured to capture a second plurality of color images and corresponding second depth information of the plurality of faces different from the face of the user, wherein the captured second plurality of color images of the plurality of faces are captured under a common ambient lighting condition.

7. The electronic apparatus according to claim 6, wherein the circuitry is further configured to:

generate a face mesh of each of the plurality of faces based on the captured second plurality of color images, wherein a first face mesh of a first face of the plurality of faces is aligned with a second face mesh of a second face of the plurality of faces; and generate each facial texture map of the plurality of facial texture maps for a corresponding face of the plurality of faces based on unwrap of the generated face mesh of the corresponding face of the plurality of faces on a U-V coordinate map.

8. The electronic apparatus according to claim 7, wherein the circuitry is further configured to generate the reference facial texture model by application of Principal Component Analysis (PCA) on the plurality of facial texture maps for the plurality of faces different from the face of the user.

9. The electronic apparatus according to claim 1, wherein the circuitry is further configured to:

determine a first plurality of triangles on the first color image; and map each triangle of the first plurality of triangles on the first color image to a corresponding triangle of a second plurality of triangles on the un-textured 3D face model, based on a perspective projection of the first color image on the un-textured 3D face model in a 3D space.

10. The electronic apparatus according to claim 9, wherein the circuitry is further configured to determine a third plurality of triangles on a U-V coordinate map, by a U-V coordinate mapping process of the second plurality of triangles on the U-V coordinate map.

11. The electronic apparatus according to claim 10, wherein the circuitry is further configured to:

compute an affine transformation between the third plurality of triangles on the U-V coordinate map and the first plurality of triangles on the first color image; and determine a textured U-V coordinate map by application of texture to each triangle of the third plurality of triangles, wherein the application of texture to each triangle is based on the computed affine transformation, and the textured U-V coordinate map is the first texture map.

12. The electronic apparatus according to claim 11, wherein the application of the texture to each triangle of the third plurality of triangles on the U-V coordinate map is further based on interpolation of color information from a corresponding triangle of the first plurality of triangles on the first color image.

13. The electronic apparatus according to claim 1, wherein the circuitry is further configured to iteratively estimate a lighting strength for each of ambient light and diffused light, a lighting direction, and a specular reflectance for the first texture map, based on a reflectance model, the first texture map, and the un-textured 3D face model, and the reflectance model comprises a relationship between the lighting strength for each of the ambient light and the diffused light, the lighting direction, and the specular reflectance.

14. The electronic apparatus according to claim 13, wherein in the texture model fitting process, the circuitry is configured to estimate a set of albedo values for a plurality of points on the first texture map, based on the reference facial texture model, the estimated lighting strength for each of the ambient light and the diffused light, the lighting direction, and the specular reflectance.

15. The electronic apparatus according to claim 1, wherein each effective point of the plurality of first effective points on the generated first texture map is a point for which a corresponding point is observed from the first color image.

16. The electronic apparatus according to claim 1, wherein the circuitry is further configured to:

compute an offset term for a plurality of points on the second texture map based on a first relationship for a first plurality of correspondences between a plurality of points on the first texture map and the plurality of points on the second texture map; and compute a smoothening term for the plurality of points on the second texture map based on a second relationship for a second plurality of correspondences between neighboring points of the plurality of points on the second texture map.

17. The electronic apparatus according to claim 16, wherein the circuitry is further configured to minimize the objective function based on the computed offset term and the computed smoothening term.

18. The electronic apparatus according to claim 17, wherein the circuitry is further configured to refine the second texture map further based on a removal of a lighting influence from the generated first texture map.

19. The electronic apparatus according to claim 18, wherein the circuitry is further configured to add the lighting influence of the first texture map to the refined second texture map.

20. The electronic apparatus according to claim 1, wherein the first portion corresponds to a front face portion of the face of the user, and the second portion corresponds to a remnant face portion of the face of the user.

21. The electronic apparatus according to claim 1, wherein the circuitry is further configured to generate a textured 3D face model of the face of the user by rendering the generated final texture map onto the un-textured 3D face model.

22. A method, comprising:

in an electronic apparatus that comprises a memory and circuitry:

generating a first texture map of a face of a user based on an un-textured three-dimensional (3D) face model, a first color image, and corresponding depth information of the face of the user;

generating a second texture map of the face of the user by texture model fitting of a reference facial texture model on a plurality of first effective points on the generated first texture map, wherein the reference facial texture model is a Principal Component Analysis (PCA) model of a plurality of facial texture maps for a plurality of faces different from the face of the user, and the plurality of first effective points corresponds to points that belong to the face of the user observed in the first color image;

refining the generated second texture map based on minimization of an objective function for the generated second texture map;

extracting a first portion of the first texture map based on a first mask for the face of the user;

extracting a second portion of the refined second texture map based on a second mask for the face of the user; and generating a final texture map for the face of the user based on a combination of the extracted first portion and the extracted second portion.

23. An electronic apparatus, comprising: circuitry configured to:
- generate a first texture map of a face of a user based on an un-textured 3D face model, a first color image, and corresponding depth information of the face of the user;
- generate a second texture map of the face of the user by a texture model fitting process of a reference facial texture model on a plurality of first effective points on the generated first texture map, wherein
    - the reference facial texture model is a Principal Component Analysis (PCA) model of a plurality of facial texture maps for a plurality of faces different from the face of the user, and
    - the plurality of first effective points corresponds to points that belong to the face of the user observed in the first color image;
- compute an offset term for a plurality of points on the second texture map based on a first relationship for a first plurality of correspondences between a plurality of points on the first texture map and the plurality of points on the second texture map;
- compute a smoothening term for the plurality of points on the second texture map based on a second relationship for a second plurality of correspondences between neighboring points of the plurality of points on the second texture map;
- refine the generated second texture map, based on a minimization of an objective function for the generated second texture map, wherein the objective function includes the computed offset term and computed smoothening term; and generate a final texture map for face of the user based on the generated first texture map and the refined second texture map.

* * * * *